US012561031B2

(12) United States Patent
Lee et al.

(10) Patent No.: US 12,561,031 B2
(45) Date of Patent: Feb. 24, 2026

(54) DISPLAY APPARATUS

(71) Applicant: Samsung Display Co., Ltd., Yongin-si (KR)

(72) Inventors: Jeongheon Lee, Yongin-si (KR); Junyoung Ko, Yongin-si (KR); Sangkook Kim, Yongin-si (KR); Jinwoo Park, Yongin-si (KR); Hansu Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/008,479

(22) Filed: Jan. 2, 2025

(65) Prior Publication Data

US 2025/0258568 A1 Aug. 14, 2025

(30) Foreign Application Priority Data

Feb. 8, 2024 (KR) ........................ 10-2024-0019831

(51) Int. Cl.
*G06F 3/041* (2006.01)
*G06F 3/044* (2006.01)

(52) U.S. Cl.
CPC ...... *G06F 3/04184* (2019.05); *G06F 3/04182* (2019.05); *G06F 3/0446* (2019.05); *G06F 3/0412* (2013.01); *G06F 3/04166* (2019.05); *G06F 3/0445* (2019.05)

(58) Field of Classification Search
CPC .. G06F 3/0412; G06F 3/04184; G06F 3/0446; G06F 3/04182; G06F 3/04166; G06F 3/0445

USPC ...................................................... 345/173, 76
See application file for complete search history.

(56) References Cited

U.S. PATENT DOCUMENTS

| | | | |
|---|---|---|---|
| 11,735,103 B2 | 8/2023 | Park et al. | |
| 11,893,181 B2 | 2/2024 | Choi | |
| 2006/0103635 A1 | 5/2006 | Park | |
| 2018/0059838 A1* | 3/2018 | Chung | G09G 3/3688 |
| 2022/0093694 A1* | 3/2022 | Park | G06F 3/0412 |
| 2022/0206660 A1* | 6/2022 | Kang | G09G 3/2092 |

(Continued)

FOREIGN PATENT DOCUMENTS

| | | |
|---|---|---|
| KR | 10-0644650 B1 | 11/2006 |
| KR | 10-2022-0017330 A | 2/2022 |

(Continued)

*Primary Examiner* — Jimmy H Nguyen
(74) *Attorney, Agent, or Firm* — Womble Bond Dickinson (US) LLP

(57) ABSTRACT

Provided is a display apparatus including pixels, a touch sensor above the pixels, and including first touch electrodes and second touch electrodes, a display driver configured to drive the pixels in a first display mode in which a frame includes a first scan period, or in a second display mode in which another frame includes the first scan period and one or more second scan periods, and a touch sensor driver configured to supply a first driving signal to the touch sensor in the first display mode, and supply a second driving signal to the touch sensor during the first scan period, and supply a third driving signal to the touch sensor during the one or more second scan periods, in the second display mode, wherein a touch report rate of the touch sensor driver is the same in the first display mode and in the second display mode.

21 Claims, 20 Drawing Sheets

(56) References Cited

U.S. PATENT DOCUMENTS

| | | |
|---|---|---|
| 2023/0147349 A1 | 5/2023 | Park et al. |
| 2023/0176689 A1 | 6/2023 | Lee et al. |

FOREIGN PATENT DOCUMENTS

| | | |
|---|---|---|
| KR | 10-2023-0033791 A | 3/2023 |
| KR | 10-2023-0040460 A | 3/2023 |
| KR | 10-2023-0067740 A | 5/2023 |

* cited by examiner

DISPLAY APPARATUS

CROSS-REFERENCE TO RELATED APPLICATION

The present application claims priority to, and the benefit of, Korean Patent Application No. 10-2024-0019831, filed on Feb. 8, 2024, in the Korean Intellectual Property Office, the entire disclosure of which is incorporated herein by reference.

BACKGROUND

1. Field

One or more embodiments relate to a display apparatus.

2. Description of the Related Art

Recently, the usage of display apparatuses has diversified. In addition, as display apparatuses have become thinner and more lightweight, their range of use has gradually been extended.

A display apparatus may include a touch-sensing apparatus as an input apparatus. The touch-sensing apparatus may include a touch sensor, and a touch sensor driving circuit configured to drive the touch sensor and generate touch data.

SUMMARY

One or more embodiments include a display apparatus with improved touch-sensing performance. However, such a technical problem is just an example, and the disclosure is not limited thereto.

Additional aspects will be set forth in part in the description which follows and, in part, will be apparent from the description, or may be learned by practice of the presented embodiments of the disclosure.

According to one or more embodiments, a display apparatus includes pixels, a touch sensor above the pixels, and including first touch electrodes and second touch electrodes, a display driver configured to drive the pixels in a first display mode in which a frame includes a first scan period, or in a second display mode in which another frame includes the first scan period and one or more second scan periods, and a touch sensor driver configured to supply a first driving signal to the touch sensor in the first display mode, and supply a second driving signal to the touch sensor during the first scan period, and supply a third driving signal to the touch sensor during the one or more second scan periods, in the second display mode, wherein a touch report rate of the touch sensor driver is the same in the first display mode and in the second display mode.

The display driver may be configured to supply a first synchronization signal to the touch sensor driver, the first synchronization signal having a first-level voltage during the first scan period and having a second-level voltage during the one or more second scan periods.

The second driving signal may have a first driving voltage, wherein the third driving signal has a second driving voltage that is greater than the first driving voltage.

The first driving signal may have a third driving voltage, wherein the first driving voltage is about 0.5 times the third driving voltage, and wherein the second driving voltage is about 1.5 times the third driving voltage.

In the second display mode, the other frame may include one first scan period and k second scan periods, the first driving signal may have a third driving voltage, the first driving voltage may be about 1/(k+1) times the third driving voltage, and the second driving voltage may be about (k+2)/(k+1) times the third driving voltage.

In the second display mode, the touch sensor driver may have a sampling number during the first scan period that is less than a sampling number during the one or more second scan periods.

The first scan period may have a first sub-period and a second sub-period, wherein the second driving signal is configured to repeat an on-voltage and an off-voltage during the first sub-period, and to maintain the off-voltage during the second sub-period.

The second driving signal and the third driving signal may have a same frequency.

The second driving signal may have a first frequency, wherein the third driving signal has a second frequency that is different from the first frequency.

The second frequency may be greater than the first frequency.

The second driving signal may have a first pulse width, wherein the third driving signal has a second pulse width that is different from the first pulse width.

The first pulse width may be less than the second pulse width.

The second driving signal and the third driving signal may have a same frequency.

The second driving signal may be a sinusoidal wave, wherein the third driving signal is a pulse wave.

According to one or more embodiments, a display apparatus includes pixels, a touch sensor above the pixels and including first touch electrodes and second touch electrodes, a display driver configured to drive the pixels in a first display mode in which a frame includes a first scan period, or in a second display mode in which another frame includes the first scan period and one or more second scan periods, and a touch sensor driver configured to supply a first driving signal to the touch sensor in the first display mode, and supply a second driving signal to the touch sensor during the first scan period, and supply a third driving signal to the touch sensor during the one or more second scan periods, in the second display mode, the second driving signal and the third driving signal being different with respect to a driving voltage, a sampling number, a frequency, or a waveform.

The display driver may be configured to supply a first synchronization signal to the touch sensor driver, the first synchronization signal having a first-level voltage during the first scan period and a second-level voltage during the one or more second scan periods.

The second driving signal may have a first driving voltage, wherein the third driving signal has a second driving voltage that is greater than the first driving voltage.

The first scan period may have a first sub-period and a second sub-period, wherein the second driving signal is configured to repeat an on-voltage and an off-voltage during the first sub-period and to maintain the off-voltage during the second sub-period.

The second driving signal and the third driving signal may have a same frequency.

The second driving signal may have a first pulse width, wherein the third driving signal has a second pulse width that is different from the first pulse width.

The second driving signal may be a sinusoidal wave, wherein the third driving signal is a pulse wave.

These and/or other aspects will become apparent and more readily appreciated from the following detailed description of the embodiments, the accompanying drawings, and claims.

These aspects may be implemented by using a system, a method, a computer program, or a combination of a certain system, method, and computer program.

BRIEF DESCRIPTION OF THE DRAWINGS

The above and other aspects of certain embodiments of the disclosure will be more apparent from the following description taken in conjunction with the accompanying drawings, in which.

DETAILED DESCRIPTION

Figure 1:
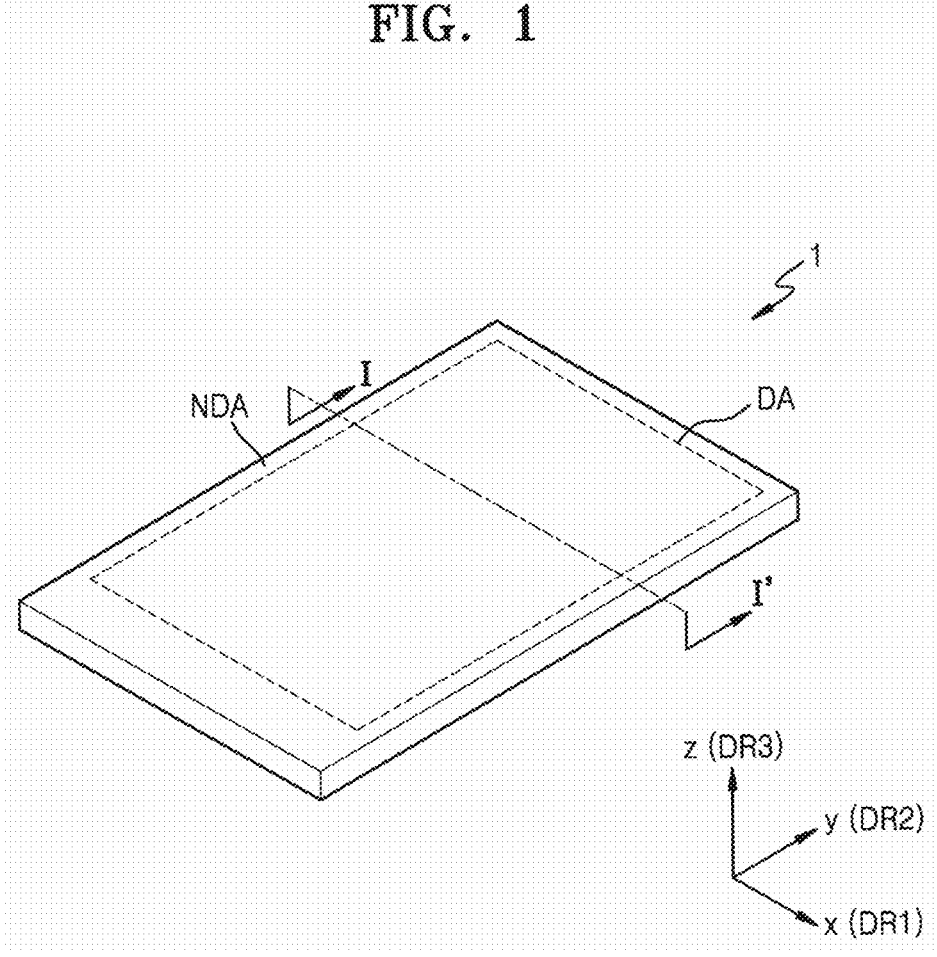
FIG. 1 is a schematic perspective view of a display apparatus according to one or more embodiments.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that the present disclosure covers all modifications, equivalents, and replacements within the idea and technical scope of the present disclosure, that each of the features of embodiments of the present disclosure may be combined with each other, in part or in whole, and technically various interlocking and operating are possible, and that each embodiment may be implemented independently of each other, or may be implemented together in an association, unless otherwise stated or implied.

In the drawings, the relative sizes of elements, layers, and regions may be exaggerated for clarity and/or descriptive purposes. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

In present specification, "ON" used in association with an element state may denote an active state of an element, and "OFF" may denote an inactive state of an element. "ON" used in association with a signal received by an element may denote a signal activating the element, and "OFF" may denote a signal inactivating the element. An element may be activated by a high-level voltage or a low-level voltage. As an example, a P-channel transistor (a P-type transistor) may be activated by a low-level voltage, and an N-channel transistor (an N-type transistor) may be activated by a high-level voltage. Accordingly, it should be understood that "ON" voltages for a P-channel transistor and an N-channel transistor are opposite (low vs. high) voltage levels. Hereinafter, a voltage that activates (turns on) a transistor is referred to as a gate on-voltage, and a voltage that inactivates (turns off) a transistor is referred to as a gate off-voltage.

Figure 2:
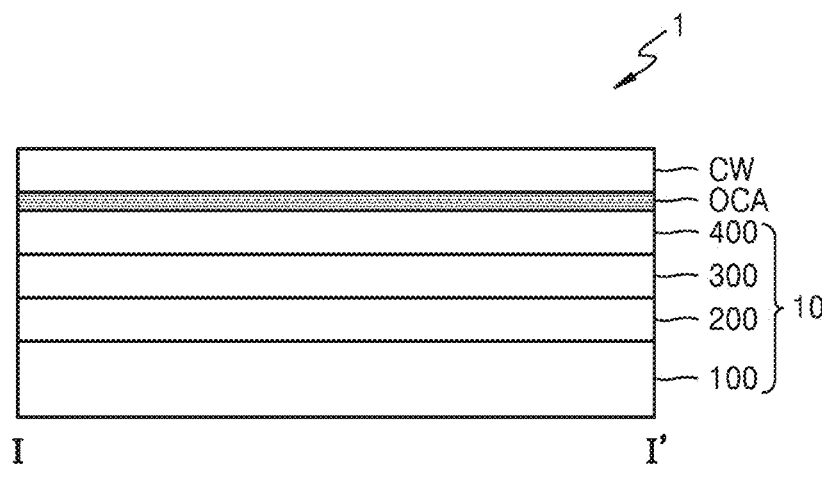
FIG. 2 is a schematic cross-sectional view of the display apparatus shown in FIG. 1, taken along the line I-I' of FIG. 1.
Figure 2:
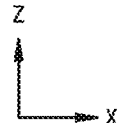

FIG. 1 is a schematic perspective view of a display apparatus 1 according to one or more embodiments, and FIG. 2 is a schematic cross-sectional view of the display apparatus 1 of FIG. 1, taken along the line I-I' of FIG. 1.

Referring to FIG. 1, the display apparatus 1 includes a display area DA configured to display images, and a non-display area NDA arranged outside the display area DA. The display apparatus 1 may display images by using light emitted from a plurality of pixels arranged in the display area DA. The non-display area NDA may be a region arranged around the display area DA, and may be a region in which pixels are not arranged. The display area DA may be surrounded by the non-display area NDA entirely. Pads may be arranged in the non-display area NDA, wherein various wirings, a printed circuit board, or a driver integrated circuit (IC) chip configured to transfer electric signals to the display area DA are attached to the pads.

Referring to FIG. 2, the display apparatus 1 may include a display panel 10, and a cover window CW on the display panel 10. The display panel 10 may include a substrate 100, a display layer 200, an encapsulation layer 300, and a touch sensor layer 400.

The substrate 100 may include an insulating material, such as glass, quartz, a polymer resin or the like. The substrate 100 may be a rigid substrate or a flexible substrate that is bendable, foldable, or rollable. As an example, the substrate 100 may include a polymer resin, such as polyethersulfone, polyacrylate, polyetherimide, polyethylene naphthalate, polyethylene terephthalate, polyphenylene sulfide, polyarylate, polyimide, polycarbonate, or cellulose acetate propionate. The substrate 100 may have a multi-layered structure including a base layer that includes the polymer resin and an inorganic layer. As an example, the substrate 100 may include two base layers, and an inorganic barrier layer therebetween.

The display layer 200 may be located on the substrate 100. The display layer 200 may be a layer including the pixels and configured to display images. The display layer 200 may include display elements and pixel circuits electrically connected to the display elements. In addition, display layer 200 may include scan lines, data lines, power lines connected to the pixel circuit, and a scan driver, wherein the scan driver is configured to apply scan signals to the scan lines.

The display element may include an emission layer. The emission layer of the display element may include an organic material, an inorganic material, quantum dots, an organic material and quantum dots, an inorganic material and quantum dots, or an organic material, an inorganic material, and quantum dots. In one or more embodiments, the display element may be an organic light-emitting diode.

The encapsulation layer 300 for encapsulating the display element may be located on the display layer 200. The encapsulation layer 300 may include at least one organic encapsulation layer to provide a more planarized base surface to the touch sensor layer 400. Accordingly, even when the touch sensor layer 400 is formed by a continuous process, a defect rate may be reduced. In one or more embodiments, the encapsulation layer 300 may include two inorganic encapsulation layers and one organic encapsulation layer therebetween.

The touch sensor layer 400 may be located on the encapsulation layer 300. The touch sensor layer 400 may include a touch sensor and touch signal lines. The display apparatus 1 may be configured to determine whether a user has entered a touch and the location of the touch by measuring the amount of change in the capacitance of touch electrodes forming the touch sensor.

In one or more embodiments, the touch sensor layer 400 may be formed with the encapsulation layer 300 by a consecutive process. As an example, the touch sensor layer 400 may be directly formed on the base surface provided by the encapsulation layer 300. In one or more other embodiments, the touch sensor layer 400 may be configured using a separate panel and attached on the encapsulation layer 300 using an adhesive and the like.

The cover window CW may be located on the display panel 10. The cover window CW may protect the upper surface of the display apparatus 1. The cover window CW may be coupled to the display apparatus 1 using an optically transparent adhesive OCA or an optically transparent resin.

In one or more embodiments, at least one functional layer may be included between the touch sensor layer 400 and the cover window CW. The functional layer may be a layer configured to perform color filtering function, color converting function, a polarizing function, and the like. The functional layer may be a sheet layer including a sheet, a film layer including a film, a thin-film layer, a coating layer, a panel, a plate, or the like. One functional layer may include a single layer, or may include a plurality of stacked thin films or coating layers. As an example, the functional layer may be a color filter, an optical filter, an optical film, or the like.

Figure 3:
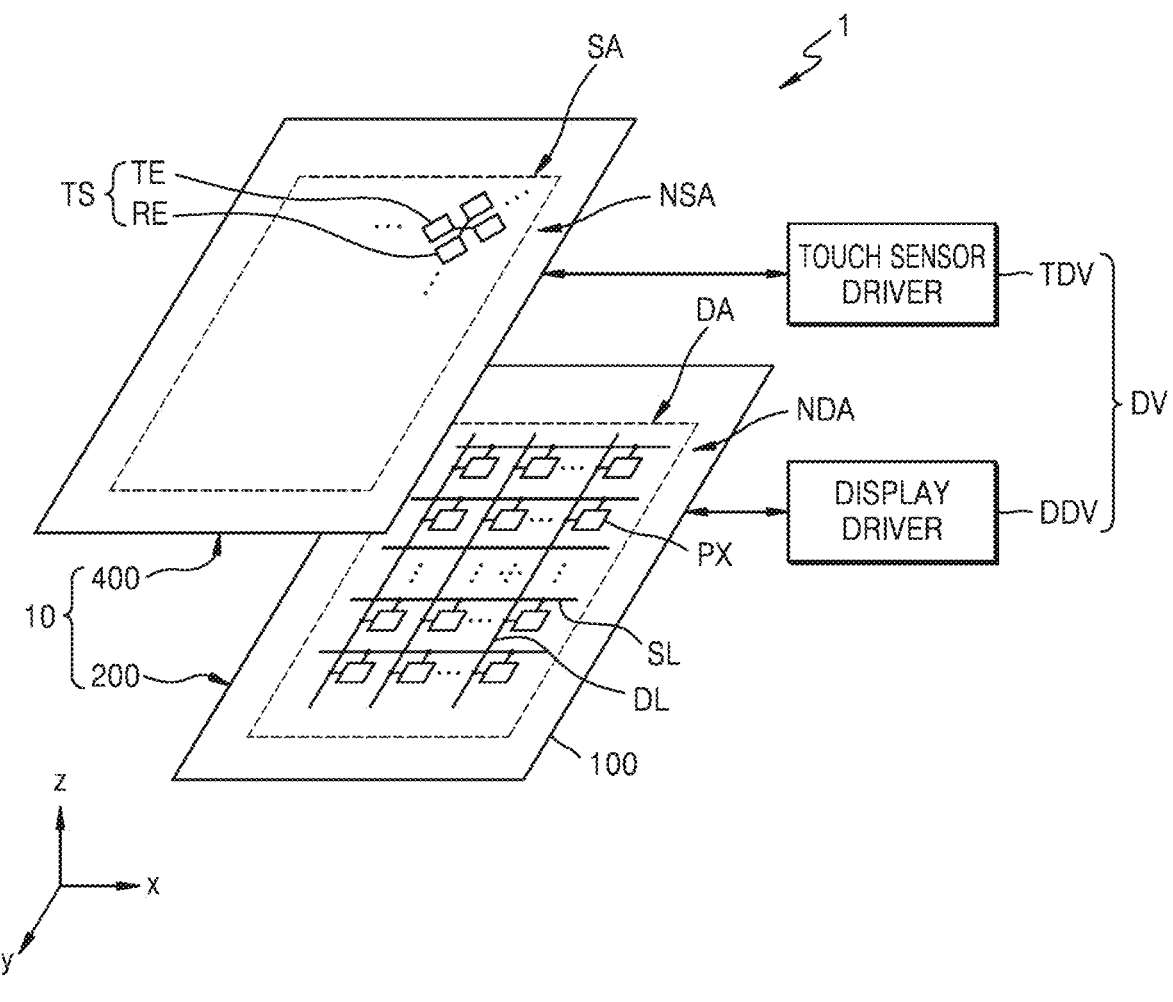
FIG. 3 is a schematic view of a display apparatus according to one or more embodiments.

FIG. 3 is a schematic view of the display apparatus 1 according to one or more embodiments.

Referring to FIG. 3, the display apparatus 1 may include the display panel 10 and a driving circuit portion DV configured to drive the display panel 10.

The display panel 10 may include the display layer 200 located on the substrate 100, and the touch sensor layer 400 located over the display layer 200. The display layer 200 may be located on the substrate 100, and the encapsulation layer 300 may be located between the display layer 200 and the touch sensor layer 400.

The display layer 200 may include pixels PX, and wirings and pads electrically connected to the pixels PX. The display area DA is a region in which the plurality of pixels PX are arranged. The display layer 200 may be configured to display preset images using light emitted from the plurality of pixels PX arranged in the display area DA. The non-display area NDA is a region arranged around the display area DA (e.g., in plan view). Various wirings and pads may be arranged in the non-display area NDA.

Each of the pixels PX may include a display element, such as an organic light-emitting diode, and a pixel circuit configured to control the display element. The pixel circuit may include a transistor, a storage capacitor, and the like.

The pixel circuit may be electrically connected to a scan line SL extending in a first direction (an x direction) and a data line DL and the like extending in a second direction (a y direction). The pixel circuit may be configured to control the display element according to a data signal transferred through the data line DL, and a scan signal transferred through the scan line SL. Each of the pixels PX may be configured to emit red, green, or blue light. Each of the pixels PX may be configured to emit red, green, blue, or white light.

The touch sensor layer 400 may include a touch sensor TS and signal lines. A touch-sensing area SA is a region in which sensing electrodes of the touch sensor TS are arranged. The touch sensor TS may be configured to obtain whether a user has entered a touch and the location of the touch by measuring the amount of change in the capacitance of the sensing electrodes arranged in the touch-sensing area SA. A non-sensing area NSA is a region arranged around the touch-sensing area SA (e.g., in plan view). The touch-sensing area SA may be surrounded by the non-sensing area NSA entirely. Signal lines electrically connected to the touch sensor TS may be arranged in the non-sensing area NSA.

The touch sensor TS may include driving electrodes TE (first touch electrodes), sensing electrodes RE (second touch electrodes), and bridge patterns. The driving electrode TE may include first body portions adjacent to each other in the first direction (the x direction), and electrically connected to each other through a first bridge pattern. The sensing electrode RE may include second body portions adjacent to each other in the second direction (the y direction), and electrically connected to each other through a second bridge pattern.

The driving circuit portion DV may include a display driver DDV and a touch sensor driver TDV. In one or more embodiments, the driving circuit portion DV may include a plurality of integrated circuits. In one or more other embodiments, the driving circuit portion DV may include a single touch display driver integration (TDDI) chip.

The display driver DDV may be configured to drive the plurality of pixels PX. As an example, the display driver DDV may include a gate driver, a data driver, a timing controller, and a voltage generator configured to apply electrical signals configured to control brightness of each of the pixels PX. In one or more embodiments, a portion of the display driver DDV may be formed on the substrate 100 together with the pixels PX, and may be mounted in the non-display area NDA of the display layer 200.

The touch sensor driver TDV may be configured to drive the touch sensor TS of the touch sensor layer 400. The touch sensor driver TDV may be configured to apply a driving signal to the touch sensor TS, to receive a sensing signal corresponding to a driving signal from the touch sensor TS, and to convert a sensing signal into touch data TD (see FIG. 7), which is a digital signal, to output the same.

Figure 4:
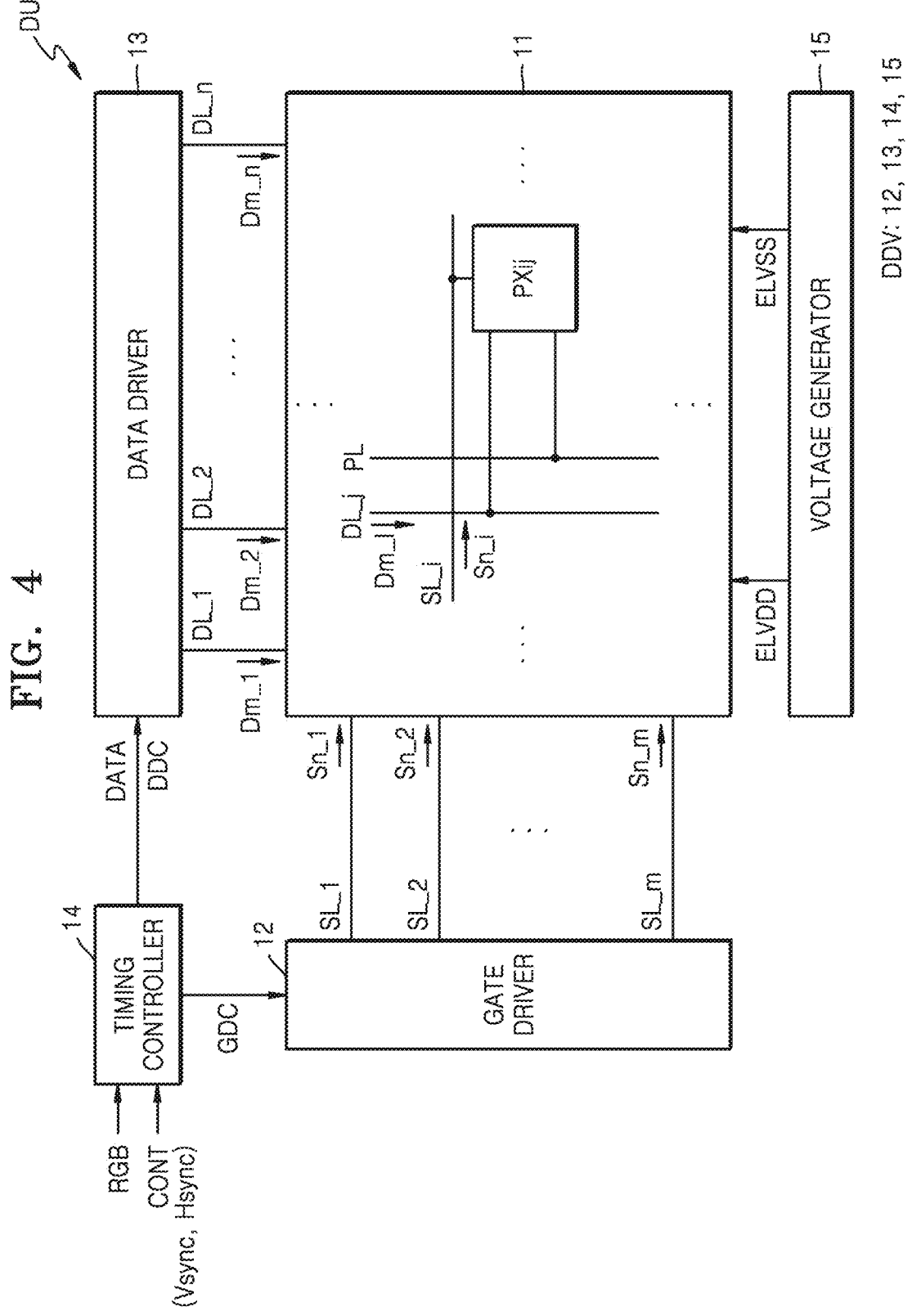
FIG. 4 is a schematic view of a display of a display apparatus according to one or more embodiments.

FIG. 4 is a schematic view of a display (e.g., display unit) DU of a display apparatus according to one or more embodiments.

Referring to FIG. 4, the display apparatus may include the display DU. The display DU may include a display 11, a gate driver 12, a data driver 13, a timing controller 14, and a voltage generator 15. As en example, the display driver DDV may include a gate driver 12, a data driver 13, a timing controller 14 and a voltage generator 15.

The display 11 includes the pixels PX, such as a pixel PXij positioned in an i-th row and a j-th column. For easy understanding, although FIG. 4 shows only one pixel PXij, m×n pixels PX may be arranged, for example, in a matrix configuration. Here, i is a natural number between 1 and m, and j is a natural number between 1 and n.

In FIG. 4, for illustrative purpose only, the description will focus on the pixel PX employing a pixel circuit including two transistors and one capacitor. However, the present disclosure is not only applied to a pixel PX employing a corresponding pixel circuit, but also may be applicable to a pixel PX employing another pixel circuit, for example, a pixel circuit including, for example, three transistors and one capacitor, and a pixel PX and the like employing a pixel circuit including seven transistors and one capacitor.

The pixels PX are connected to scan lines SL_1, SL_2, . . . and SL_m, data lines DL_1, DL_2, ... and DL_n, and a power line PL. As an example, a pixel PXij positioned in an i-th row and a j-th column may be connected to a scan line SL_i, a data line DL_j, and the power line PL.

The data lines DL_1, DL_2, . . . and DL_n may extend in the second direction (the y direction), and may be connected to the pixels PX arranged in the same column. The scan lines SL_1, SL_2, . . . and SL_m may extend in the first direction (the x direction), and may be connected to the pixels PX arranged in the same row.

The power line PL may include a plurality of vertical power lines extending in the second direction (the y direction), and the plurality of vertical power lines be connected to the pixels PX positioned in the same column.

The scan lines SL_1, SL_2, . . . and SL_m are configured to transfer scan signals Sn_1 to Sn_m output from the gate driver 12 to the pixels PX in the same row. The data lines DL_1, DL_2, . . . and DL_n are configured to transfer data signals Dm_1 to Dm_n output from the data driver 13 to the pixels PX in the same column. The pixel PXij positioned in the i-th row and the j-th column is configured to receive a scan signal Sn_i and a data signal Dm_j.

The power line PL is configured to transfer a first power voltage ELVDD generated from the voltage generator 15 to the pixels PX.

The pixel PXij includes a display element and a driving transistor configured to control the amount of current flowing through the display element based on a data signal Dm_j. A data signal Dm_j is output from the data driver 13, and is received by the pixel PXij through the data line DL_j. The display element may be, for example, an organic light-emitting diode. Because the display element is configured to emit light at a brightness corresponding to the amount of current received from the driving transistor, the pixel PXij may be configured to express a grayscale corresponding to the data signal Dm_j. The pixel PX may correspond to a portion, for example, a sub-pixel of a unit pixel capable of displaying full colors.

The voltage generator 15 may be configured to generate voltages suitable to drive the pixel PXij. As an example, the voltage generator 15 may be configured to generate the first power voltage ELVDD and a second power voltage ELVSS. A level of the first power voltage ELVDD may be greater than the second power voltage ELVSS.

The voltage generator 15 may be configured to generate an initialization voltage, and to provide the same to the pixels PX. The initialization voltage may be applied to a gate of the driving transistor and/or an anode of the display element.

In addition, the voltage generator 15 may be configured to generate a turn-on voltage and a turn-off voltage for controlling a switching transistor of the pixel PXij, and to provide the turn-on voltage and the turn-off voltage to the gate driver 12. When the turn-on voltage is applied to a gate of the switching transistor, the switching transistor may be turned on, and when the turn-off voltage is applied to the gate of the switching transistor, the switching transistor may be turned off. The voltage generator 15 may be configured to generate gamma reference voltages, and to provide the same to the data driver 13.

The timing controller 14 may be configured to control the display 11 by controlling operation timings of the gate driver 12 and the data driver 13. The pixels PX of the display 11 may be configured to display an image corresponding to image source data RGB of one frame by receiving a new data signal Dm (see FIG. 5), and by emitting light at a brightness corresponding to the data signal Dm (see FIG. 5) for each frame period.

The timing controller 14 is configured to receive image source data RGB and a control signal CONT from the outside. The timing controller 14 may be configured to convert image source data RGB into image data DATA based on characteristics and the like of the display 11 and the pixels PX. The timing controller 14 may be configured to provide image data DATA to the data driver 13.

A control signal CONT may include a vertical synchronization signal Vsync, a horizontal synchronization signal Hsync, a data enable signal, a clock signal, and the like. The vertical synchronization signal Vsync may define a start of a section (hereinafter, referred to as one frame period) in which image data DATA forming one frame is written. The horizontal synchronization signal Hsync may define a start of a section in which image data DATA forming a horizontal line image displayed through one pixel row is written. The timing controller 14 may be configured to control operation timings of the gate driver 12 and the data driver 13 using a control signal CONT. The timing controller 14 may be configured to determine a frame period by counting a data enable signal of a horizontal scanning period. Image source data RGB includes luminance information of the pixels PX. The luminance may have a set number of gray levels, for example, 1024 ($=2^{10}$), 256 ($=2^8$), or 64 ($=2^6$).

The timing controller 14 may be configured to generate control signals including a gate-timing control signal GDC for controlling an operation timing of the gate driver 12 and a data-timing control signal DDC for controlling an operation timing of the data driver 13. In one or more embodiments, the timing controller 14 may be configured to generate a synchronization signal for controlling operation timing of the touch sensor driver TDV using a vertical synchronization signal Vsync.

A gate-timing control signal GDC may include a gate start pulse, a gate shift clock, a gate output enable signal, and the like. A gate start pulse is supplied to the gate driver 12 that generates a first scan signal at a start point of a scanning period. A gate shift clock is a clock signal commonly input to the gate driver 12 and a clock signal for shifting a gate start pulse. A gate output enable signal is configured to control an output of the gate driver 12.

A data-timing control signal DDC may include a source start pulse, a source sampling clock, a source output enable signal, and the like. A source start pulse is configured to control a data sampling start point of the data driver 13, and is provided to the data driver 13 at a start point of a scanning period. A source sampling clock is a clock signal configured to control a sampling operation of data within the data driver 13 based on a rising or falling edge. A source output enable signal is configured to control an output of the data driver 13. A source start pulse supplied to the data driver 13 may be omitted depending on a data transmission method.

The gate driver 12 is configured to sequentially generate scan signals Sn_1 to Sn_m in response to a gate-timing control signal GDC supplied from the timing controller 14 using a turn-on voltage or a turn-off voltage supplied from the voltage generator 15. The gate driver 12 may include a plurality of transistors, and may be formed together with the pixels PX through a thin-film process. As an example, the gate driver 12 may be mounted in the form of an amorphous silicon TFT gate driver circuit (ASG) or an oxide semiconductor TFT gate driver circuit (OSG) in the non-display area NDA of the display panel 10.

The data driver 13 is configured to sample and latch image data DATA supplied from the timing controller 14 in response to a data-timing control signal DDC supplied from the timing controller 14, and to convert the same into data in a parallel data system. When converting image data DATA into data in a parallel data system, the data driver 13 converts the image data DATA into a gamma reference voltage, and converts the image data DATA into a data signal of an analog form. The data driver 13 is configured to provide data signals Dm_1 to Dm_n to the pixels PX through the data lines DL_1 to DL_n. The pixels PX are configured to receive data signals Dm_1 to Dm_n in response to scan signals Sn_1 to Sn_m.

In one or more embodiments, the display DU may support a variable refresh rate (VRR). The refresh rate is a frequency at which a data signal is substantially written on a driving transistor of a pixel PX, and also called a screen scan rate or a screen reproduction rate. The refresh rate may represent the number of image frames reproduced for one second. In one or more embodiments, the refresh rate may be an output frequency of the gate driver 12 and/or the data driver 13. A frequency corresponding to the refresh rate may be a driving frequency. The display DU may be configured to adjust an output frequency of the gate driver 12 and an output frequency of the data driver 13 corresponding thereto according to the driving frequency. The display DU supporting a variable refresh rate may operate by changing the driving frequency within a range between a maximum driving frequency and a minimum driving frequency. As an example, in the case where the refresh rate is about 120 Hz, a gate signal may be output to each horizontal line (row) about 120 times per second in synchronization with a timing of writing a data signal from the gate driver 12. The display DU may be configured to display images by changing the driving frequency according to the refresh rate.

Figure 5:
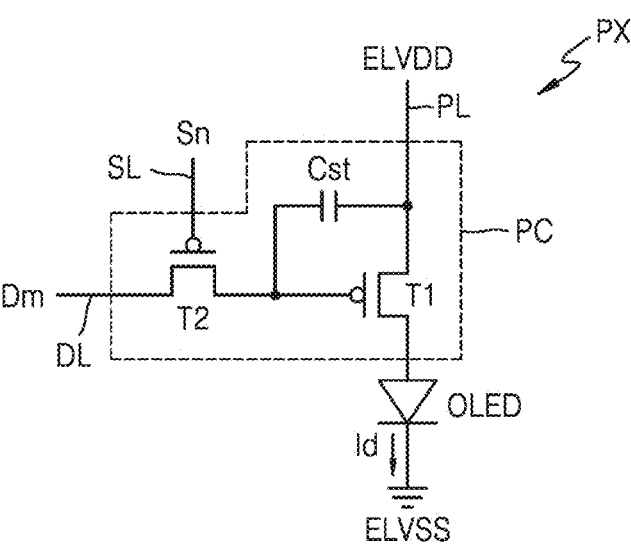
FIG. 5 is a schematic equivalent circuit diagram of a pixel included in a display apparatus according to one or more embodiments.

FIG. 5 is a schematic equivalent circuit diagram of the pixel PX included in a display apparatus according to one or more embodiments.

Referring to FIG. 5, the pixel PX may include a pixel circuit PC and the display element connected to the pixel circuit PC, wherein the pixel circuit PC is connected to the scan line SL and the data line DL. The display element may be an organic light-emitting diode OLED including a pixel electrode (an anode) and an opposite electrode (a cathode). The opposite electrode of the organic light-emitting diode OLED may be a common electrode to which the second power voltage ELVSS is applied.

The pixel circuit PC may include a first transistor T1, a second transistor T2, and a storage capacitor Cst. The first transistor T1 may be a driving transistor in which the magnitude of a drain current thereof is determined according to a gate-source voltage thereof, and the second transistor T2 may be a switching transistor that is turned on/off according to a gate-source voltage, substantially a gate voltage. The first transistor T1 and the second transistor T2 may each be implemented as thin-film transistors.

The first transistor T1 may be denoted by a driving transistor, and the second transistor T2 may be denoted by a scan transistor.

The storage capacitor Cst is connected between the power line PL and a gate of the first transistor T1. The storage capacitor Cst may include a second electrode connected to the power line PL, and a first electrode connected to a gate of the first transistor T1. The storage capacitor Cst may be configured to store a voltage corresponding to a difference between a voltage transferred from the second transistor T2 and the first power voltage ELVDD supplied to the power line PL.

The first transistor T1 may include the gate connected to the first electrode of the storage capacitor Cst, a first terminal connected to the power line PL, and a second terminal connected to the organic light-emitting diode OLED. The first transistor T1 may be configured to control the magnitude of a driving current $I_d$ flowing through the organic light-emitting diode OLED from the power line PL according to a gate-source voltage. The organic light-emitting diode OLED may be configured to emit light having a preset brightness corresponding to the driving current Id.

The second transistor T2 may include a gate connected to the scan line SL, a drain connected to the data line DL, and a source connected to the gate of the first transistor T1. The second transistor T2 may be configured to transfer a data signal Dm to the gate of the first transistor T1 in response to a scan signal Sn.

Although it is described with reference to FIG. 5 that the pixel circuit PC includes only a p-type transistor, the disclosure is not limited thereto. In one or more embodiments, the pixel circuit PC may include only an n-type transistor. In one or more other embodiments, the pixel circuit PC may include at least one p-type transistor and at least one n-type transistor.

The p-type transistor may be a silicon transistor. The silicon transistor may include a silicon semiconductor, and the silicon semiconductor may include amorphous silicon, polycrystalline silicon, and the like. As an example, the silicon transistor may be a low temperature polycrystalline silicon (LTPS) thin-film transistor.

The n-type transistor may be an oxide transistor. The oxide transistor may include an oxide semiconductor, and the oxide semiconductor is a Zn-oxide-based material and may include a Zn oxide, an In—Zn oxide, a Ga—In—Zn oxide, and the like. In one or more embodiments, the oxide semiconductor may be an In—Ga—Zn—O (IGZO) semiconductor. In one or more embodiments, the oxide semiconductor may be an In—Sn—Ga—Zn—O (ITGZO) semiconductor.

Although it is described with reference to FIG. 5 that the pixel circuit PC includes two transistors and one storage capacitor, the present disclosure is not limited thereto. As an example, the pixel circuit PC may include three or more transistors and/or two or more capacitors. In one or more embodiments, the pixel circuit PC may include three transistors and one capacitor. In one or more other embodiments, the pixel circuit PC may include seven transistors and one capacitor.

Figure 6:
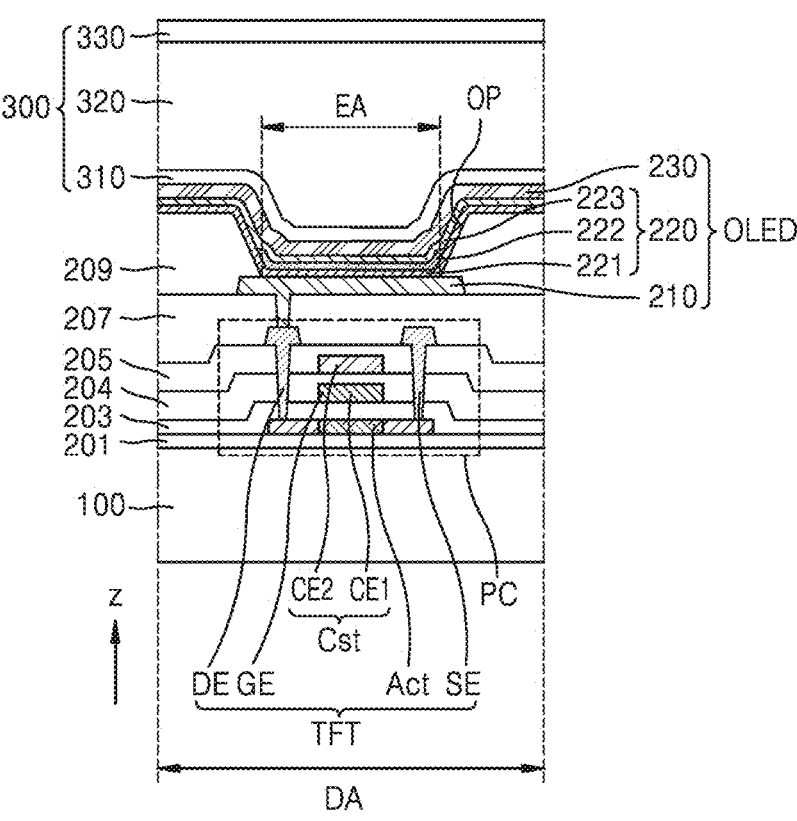
FIG. 6 is a schematic cross-sectional view of a display apparatus according to one or more embodiments.

FIG. 6 is a schematic cross-sectional view of a display apparatus according to one or more embodiments.

Referring to FIG. 6, the display layer 200 (see FIG. 2) and the encapsulation layer 300 may be sequentially stacked on the substrate 100 in the display area DA of the display apparatus. The organic light-emitting diode OLED as a display element, and the pixel circuit PC electrically connected to the organic light-emitting diode OLED, may be located in the display layer 200.

The substrate 100 may include an insulating material, such as glass, quartz, a polymer resin or the like. The substrate 100 may be a rigid substrate or a flexible substrate that is bendable, foldable, or rollable.

A buffer layer 201 may be located on the substrate 100, may reduce or block penetration of foreign materials, moisture, or external air from below the substrate 100, and may provide a flat surface on a semiconductor layer Act. The buffer layer 201 may include an inorganic material, an organic material, or an organic/inorganic composite material, and include a single layer or a multi-layer including an inorganic material and/or an organic material, the inorganic material including oxide or nitride.

The pixel circuit PC may be located over the buffer layer 201, wherein the pixel circuit PC includes a thin-film transistor TFT and the storage capacitor Cst. The thin-film transistor TFT may correspond to the first transistor T1 described with reference to FIG. 5.

The thin-film transistor TFT may include the semiconductor layer Act, a gate electrode GE, a drain electrode DE, and a source electrode SE.

The semiconductor layer Act may be located on the buffer layer 201 and may include polycrystalline silicon. In one or more other embodiments, the semiconductor layer Act may include amorphous silicon. In one or more other embodiments, the semiconductor layer Act may include an oxide of at least one of indium (In), gallium (Ga), stannum (Sn), zirconium (Zr), vanadium (V), hafnium (Hf), cadmium (Cd), germanium (Ge), chromium (Cr), titanium (Ti), or zinc (Zn). The semiconductor layer Act may include a channel region, a source region, and a drain region, the source region and the drain region being doped with impurities. The source region and the drain region may be respectively located on two opposite sides of the channel region.

A first gate-insulating layer 203 may be located to cover the semiconductor layer Act. The first gate-insulating layer 203 may include an inorganic insulating material, such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide (ZnOx). The first gate-insulating layer 203 may include a single layer or a multi-layer including the inorganic insulating material.

The gate electrode GE is located on the first gate-insulating layer 203 to overlap the semiconductor layer Act. The gate electrode GE may include at least one of molybdenum (Mo), aluminum (Al), copper (Cu), titanium (Ti), or the like, and may include a single layer or a multi-layer. As an example, the gate electrode GE may include a single molybdenum layer.

A second gate-insulating layer 204 may be provided to cover the gate electrode GE. The second gate-insulating layer 204 may include an inorganic insulating material, such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). The second gate-insulating layer 204 may include a single layer or a multi-layer including the inorganic insulating material.

A second electrode CE2 of the storage capacitor Cst may be located on the second gate-insulating layer 204. The second electrode CE2 may overlap the gate electrode GE. The gate electrode GE and the second electrode CE2 may overlap each other with the second gate-insulating layer 204 therebetween to form the storage capacitor Cst. That is, the gate electrode GE may serve as a first electrode CE1 of the storage capacitor Cst.

The second electrode CE2 may include aluminum (Al), platinum (Pt), palladium (Pd), silver (Ag), magnesium (Mg), gold (Au), nickel (Ni), neodymium (Nd), iridium (Ir), chrome (Cr), calcium (Ca), molybdenum (Mo), titanium (Ti), tungsten (W), and/or copper (Cu), and may include a single layer or a multi-layer including the above materials.

An interlayer insulating layer 205 may be located to cover the second electrode CE2. The interlayer insulating layer 205 may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). The interlayer insulating layer 205 may include a single layer or a multi-layer including the inorganic insulating material.

The source electrode SE and the drain electrode DE may be located on the interlayer insulating layer 205. The source electrode SE and the drain electrode DE may each include a conductive material including molybdenum (Mo), aluminum (Al), copper (Cu), or titanium (Ti), and may include a single layer or a multi-layer including the above materials. As an example, the source electrode SE and the drain electrode DE may have a multi-layered structure of Ti/Al/Ti. In one or more embodiments, the source electrode SE or the drain electrode DE may be omitted. As an example, adjacent thin-film transistors TFT may be configured to share the source region or the drain region of the semiconductor layer Act. The source region or the drain region may serve as the source electrode SE or the drain electrode DE.

A planarization insulating layer 207 may be located to cover the source electrode SE and the drain electrode DE. The planarization insulating layer 207 may provide a flat base surface to a pixel electrode 210 located thereon.

The planarization insulating layer 207 may include an organic material or an inorganic material, and include a single-layered structure or a multi-layered structure. The planarization insulating layer 207 may include a general-purpose polymer, such as benzocyclobutene (BCB), polyimide, hexamethyldisiloxane (HMDSO), polymethylmethacrylate (PMMA), or polystyrene (PS), polymer derivatives having a phenol-based group, an acrylic-based polymer, an imide-based polymer, an aryl ether-based polymer, an amide-based polymer, a fluorine-based polymer, a p-xylene-based polymer, or a vinyl alcohol-based polymer. The planarization insulating layer 207 may include an inorganic insulating material, such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). While the planarization insulating layer 207 is formed, to provide a flat upper surface after the layer is formed, chemical mechanical polishing may be performed on the upper surface of the layer.

The pixel electrode 210 may be located on the planarization insulating layer 207. The planarization insulating layer 207 may have a via hole that exposes one of the source electrode SE and the drain electrode DE of the thin-film transistor TFT. The pixel electrode 210 may be electrically connected to the thin-film transistor TFT by being in contact with the source electrode SE or the drain electrode DE through the via hole.

The pixel electrode 210 may include a conductive oxide, such as indium tin oxide (ITO), indium zinc oxide (IZO), indium tin zinc oxide (ITZO), zinc oxide (ZnO), indium oxide ($In_2O_3$), indium gallium oxide (IGO), or aluminum zinc oxide (AZO). The pixel electrode 210 may include a reflective layer including silver (Ag), magnesium (Mg), aluminum (Al), platinum (Pt), palladium (Pd), gold (Au), nickel (Ni), neodymium (Nd), iridium (Ir), chrome (Cr), or a compound thereof. As an example, the pixel electrode 210 may have a structure including layers on/under the reflective layer, the layers including ITO, IZO, ZnO, or $In_2O_3$. In this case, the pixel electrode 210 may have a stack structure of ITO/Ag/ITO.

The pixel-defining layer 209 may cover the edges of the pixel electrode 210 on the planarization insulating layer 207, and may have, or define, a pixel opening OP that exposes the central portion of the pixel electrode 210. An emission area EA of the organic light-emitting diode OLED, that is, the size and shape of the pixel are defined by the pixel opening OP.

The pixel-defining layer 209 may reduce or prevent the likelihood of arcs and the like occurring at the edges of the pixel electrode 210 by increasing a distance between the edges of the pixel electrode 210 and an opposite electrode 230 over the pixel electrode 210. The pixel-defining layer 209 may include an organic insulating material, such as polyamide, an acryl resin, benzocyclobutene, or hexamethyldisiloxane (HMDSO), and may be formed by spin coating and the like.

The pixel-defining layer 209 may be formed in black. The pixel-defining layer 209 may include a light-blocking material, and may be provided in black. The light-blocking material may include carbon black, carbon nanotubes, a resin or paste including black dye, metal particles, for example, nickel (Ni), aluminum (Al), molybdenum (Mo), or an alloy thereof, metal oxide particles (e.g., chrome oxide) or metal nitride particles (e.g., chrome nitride). In the case where the pixel-defining layer 209 includes a light-blocking material, outer reflection by a metal structure located below the pixel-defining layer 209 may be reduced.

An intermediate layer 220 may be located between the pixel electrode 210 and the opposite electrode 230. The intermediate layer 220 may include a first functional layer 221, an emission layer 222, and a second functional layer 223.

The emission layer 222 is located in the pixel opening OP of the pixel-defining layer 209, wherein the emission layer 222 is formed to correspond to the pixel electrode 210. The emission layer 222 may include a polymer material or a low-molecular weight material, and may be configured to emit red, green, blue, or white light.

The first functional layer 221 and the second functional layer 223 may be respectively located under and/or above the emission layer 222. In one or more embodiments, unlike the emission layer 222 patterned for each pixel, the first functional layer 221 and the second functional layer 223 may be integrally provided in the display area DA entirely.

The first functional layer 221 may include a single layer or a multi-layer. As an example, in the case where the first functional layer 221 includes a polymer material, the first functional layer 221 may include a hole transport layer, which has a single-layered structure, and may include polyethylene dihydroxythiophene (PEDOT: poly-(3,4)-ethylenedihydroxy thiophene) or polyaniline (PANI: polyaniline). In the case where the first functional layer 221 includes a low-molecular weight material, the first functional layer 221 may include a hole injection layer and a hole transport layer.

The second functional layer 223 may be omitted. As an example, in the case where the first functional layer 221 and the emission layer 222 include a polymer material, it may be suitable that the second functional layer 223 is formed. The second functional layer 223 may include a single layer or a multi-layer. The second functional layer 223 may include an electron transport layer and/or an electron injection layer. In one or more embodiments, at least one of a hole injection layer, a hole transport layer, an electron transport layer, or an electron injection layer may be omitted.

The opposite electrode 230 may include a conductive material having a relatively low work function. As an example, the opposite electrode 230 may include a (semi) transparent layer including silver (Ag), magnesium (Mg), aluminum (Al), nickel (Ni), chromium (Cr), lithium (Li), calcium (Ca), or an alloy thereof. Alternatively, the opposite electrode 230 may further include a layer on the (semi) transparent layer, the layer including ITO, IZO, ZnO, or $In_2O_3$. In one or more embodiments, the opposite electrode 230 may include silver (Ag) and magnesium (Mg).

A stack structure of the pixel electrode 210, the intermediate layer 220, and the opposite electrode 230 that are sequentially stacked may form the organic light-emitting diode OLED.

In one or more embodiments, a capping layer may be located on the organic light-emitting diode OLED. The capping layer may be configured to improve a light-emission efficiency of the organic light-emitting diode OLED based on constructive interference. The capping layer may be an organic capping layer including an organic material, an inorganic capping layer including an inorganic material, or a composite capping layer including an organic material and an inorganic material.

The encapsulation layer 300 may be located on the organic light-emitting diode OLED. In one or more embodiments, the encapsulation layer 300 may include at least one inorganic encapsulation layer and at least one organic encapsulation layer. As an example, the encapsulation layer 300 may include a first inorganic encapsulation layer 310, a second inorganic encapsulation layer 330, and an organic encapsulation layer 320 therebetween.

The first and second inorganic encapsulation layers 310 and 330 may each include at least one inorganic insulating materials. The inorganic insulating materials include aluminum oxide ($Al_2O_3$), titanium oxide ($TiO_2$), tantalum oxide ($Ta_2O_5$), hafnium oxide ($HfO_2$), zinc oxide (ZnO), silicon oxide ($SiO_x$), silicon nitride ($SiN_x$), or/and silicon oxynitride (SiON). The first and second inorganic encapsulation layers 310 and 330 may each be formed by chemical vapor deposition.

The organic encapsulation layer 320 may further include polyethylene terephthalate, polyethylene naphthalate, polycarbonate, polyimide, polyethylene sulfonate, polyoxymethylene, polyarylate, hexamethyldisiloxane (HMDSO), an acrylic resin, or a combination thereof.

The encapsulation layer 300 may cover the display area DA entirely, extend toward the non-display area NDA, and may be arranged to cover at least a portion of the non-display area NDA.

As described above, the encapsulation layer 300 may include the organic encapsulation layer 320 to provide a more planarized base surface. Accordingly, even when elements of the touch sensor layer 400 (see FIG. 2) are formed by a continuous process, a defect rate may be reduced.

Figure 7:
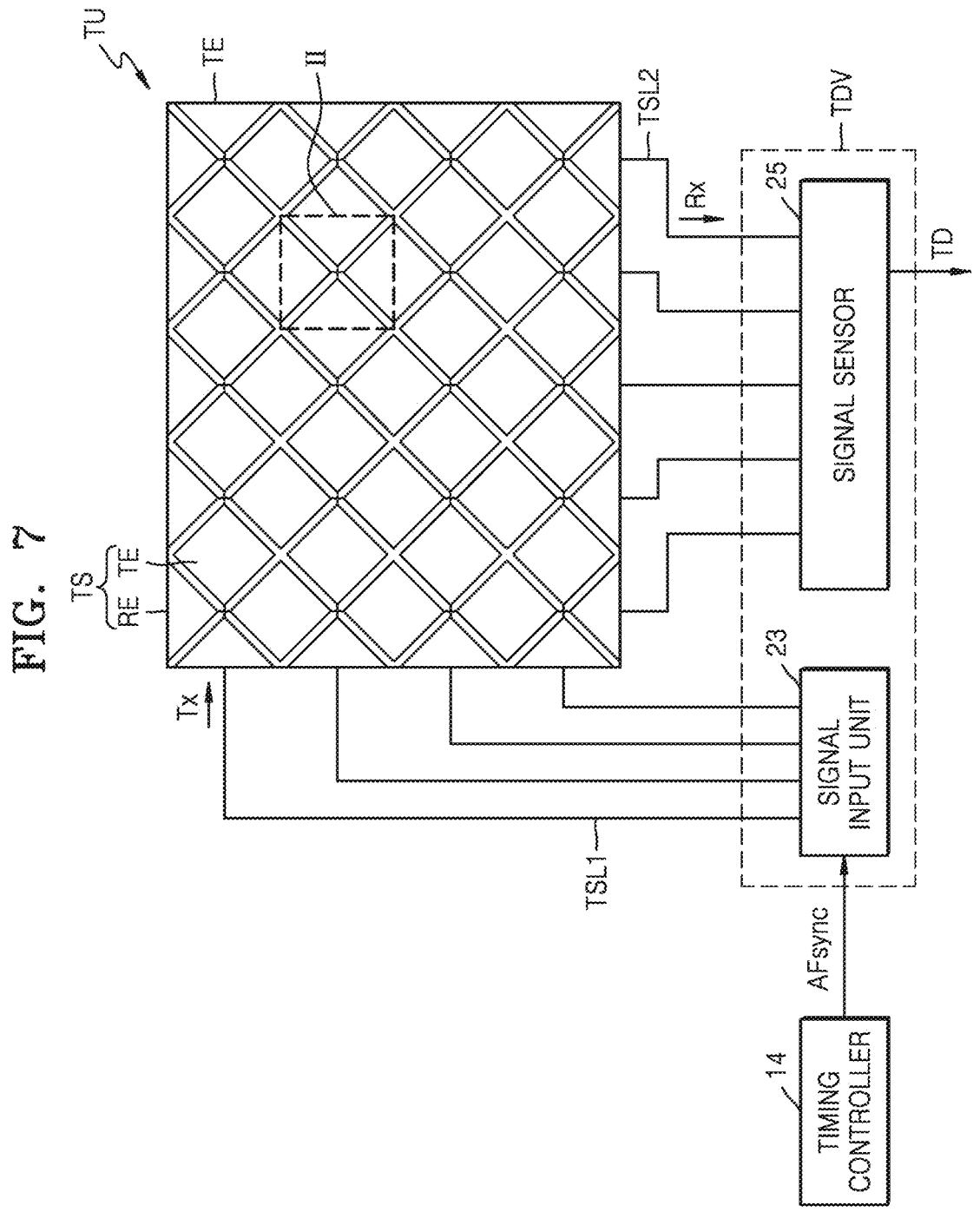
FIG. 7 is a schematic view of a touch sensor device of a display apparatus according to one or more embodiments.

FIG. 7 is a schematic view of a touch sensor device (e.g., touch sensor unit) of a display apparatus according to one or more embodiments.

Referring to FIG. 7, the display apparatus may include a touch sensor device TU. The touch sensor device TU may include the touch sensor TS and the touch sensor driver TDV.

The touch sensor TS may include the driving electrodes TE and the sensing electrodes RE. The driving electrode TE may include first body portions adjacent to each other in the first direction (the x direction), and electrically connected to each other through a first bridge pattern. The sensing electrode RE may include second body portions adjacent to each other in the second direction (the y direction), and electrically connected to each other through a second bridge pattern. The driving electrode TE extending in the first direction (the x direction) and the sensing electrode RE extending in the second direction (the y direction) may cross each other. For easy understanding, although FIG. 7 shows four driving electrodes TE and five sensing electrodes RE, the number of driving electrodes TE and the number of sensing electrodes RE may be variously changed.

The touch sensor driver TDV may include a signal input (e.g., signal input unit) 23 and a signal sensor 25. The signal input 23 may be configured to generate a driving signal Tx synchronized with an active frame synchronization signal AFsync.

The active frame synchronization signal AFsync is a signal synchronized with a vertical synchronization signal Vsync, and may be a signal representing a time section in which an address scan operation and a self-scan operation of the display DU are performed. In one or more embodiments, the signal input 23 may be configured to receive an active frame synchronization signal AFsync from the timing controller 14. In one or more other embodiments, the signal input 23 may be configured to receive an active frame synchronization signal AFsync from an application processor. The signal input 23 may be configured to generate a driving signal Tx based on an active frame synchronization signal AFsync, and to apply a driving signal Tx to each of the driving electrodes TE through first touch signal lines TSL1.

In one or more embodiments, the signal input 23 may operate using code division multiplexing. As an example, the signal input 23 may be configured to concurrently or substantially simultaneously apply driving signals Tx to a plurality of channels electrically connected to the driving electrodes TE. In this case, at least some of the driving signals Tx may have different frequencies or waveforms. In one or more embodiments, the signal input 23 may be configured to operate using time division driving. As an example, the signal input 23 may be configured to sequentially apply driving signals Tx to the driving electrodes TE, respectively.

The sensing electrode RE may be configured to transfer a sensing signal Rx to the signal sensor 25 through a second touch signal line TSL2, wherein the sensing signal Rx corresponds to a driving signal Tx applied to the driving electrode TE. In the case where a touch event occurs in a corresponding region of the touch sensor TS, a self-capacitance of the driving electrode TE and/or the sensing electrode RE arranged in the relevant region, and a mutual capacitance between the driving electrode TE and the sensing electrode RE may change. A sensing signal Rx may change due to this capacitance change. The signal sensor 25 may be configured to receive a sensing signal Rx from each of the sensing electrodes RE through each of the second touch signal lines TSL2, and to convert a sensing signal Rx to a digital signal to obtain touch data TD including whether a touch input has been made and information of a touch location.

The signal sensor 25 may include an analog front end configured to receive a sensing signal, which is an analog signal, an analog-digital converter configured to convert a received sensing signal Rx to a digital signal, and a processor configured to process a digital signal and generate touch data TD.

In one or more embodiments, the touch sensor device TU may support a preset touch report rate. The touch report rate is a frequency of a series of operations, such as driving signals Tx are applied to the driving electrodes TE of the touch sensor TS, sensing signals Rx are received from the sensing electrodes RE, and touch data TD generated by processing received sensing signals Rx is transmitted to an external host system. The touch report rate may represent the number of touch scan operations performed per second.

In one or more embodiments, a touch report rate of the touch sensor device TU may be the same as a maximum refresh rate of the display DU. As an example, a maximum refresh rate of the display DU is about 120 Hz, a touch report rate of the touch sensor device TU may be about 120 Hz. Even in the case where the display DU adjusts a refresh rate according to a display mode, a touch report rate of the touch sensor device TU may be maintained at about 120 Hz. Accordingly, even in the case where a display mode of the display DU changes, constant accuracy and sensitivity of a touch input may be maintained.

Figure 8A:
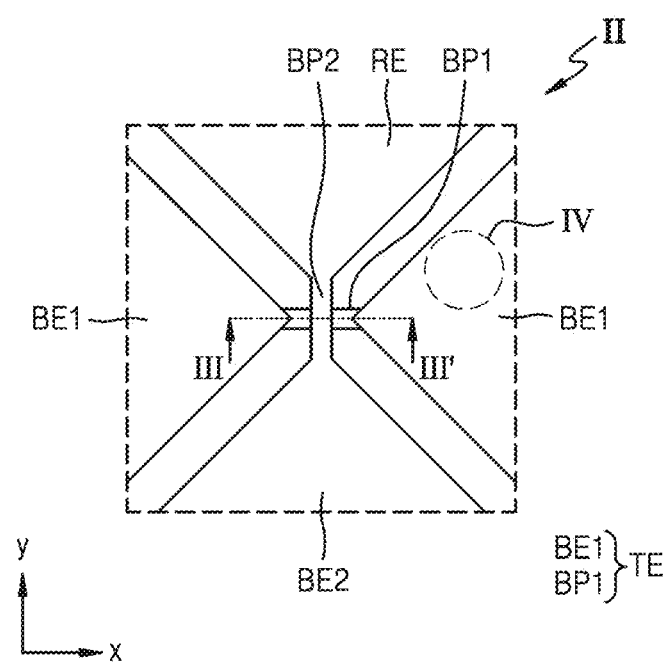
FIG. 8A is a schematic plan view of a touch sensor according to one or more embodiments.
Figure 8B:
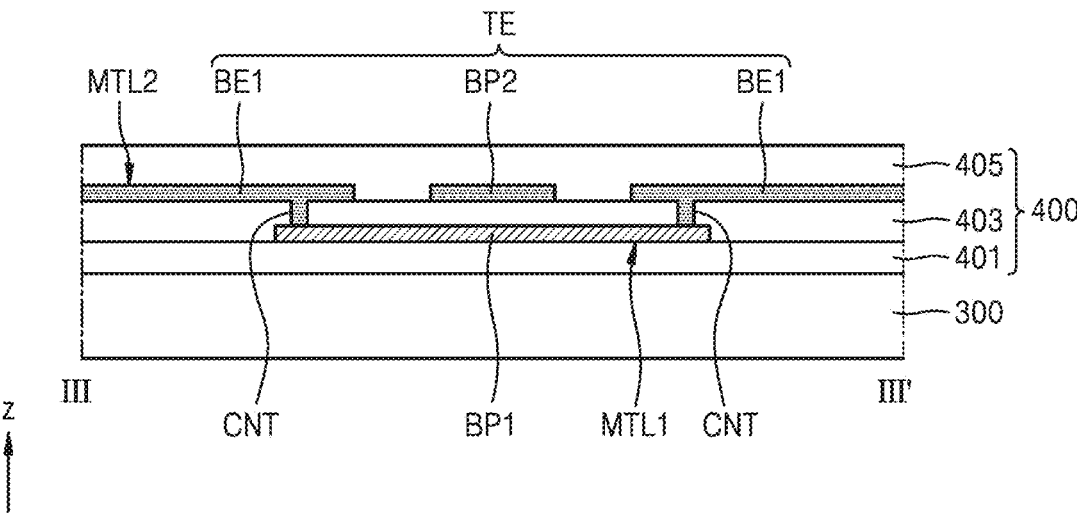
FIG. 8B is a schematic cross-sectional view of a touch sensor according to one or more embodiments.
Figure 8C:
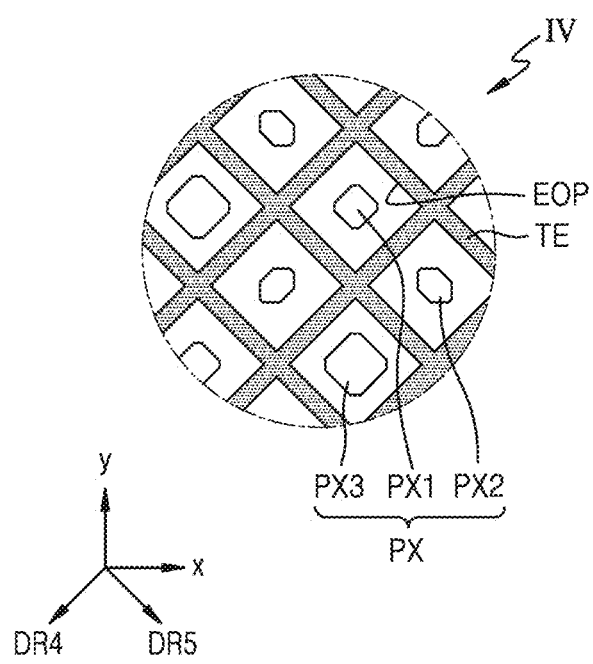
FIG. 8C is a schematic plan view of a driving electrode according to one or more embodiments.

FIG. 8A is a schematic plan view of the touch sensor TS according to one or more embodiments, FIG. 8B is a schematic cross-sectional view of the touch sensor TS according to one or more embodiments, and FIG. 8C is a schematic plan view of the driving electrode TE according to one or more embodiments.

FIG. 8A is an enlarged schematic view of a region II of the touch sensor shown in FIG. 7. Referring to FIG. 8A, the touch sensor TS may include the driving electrode TE and the sensing electrode RE. The driving electrode TE may include first body portions BE1 adjacent to each other in the first direction (the x direction), and a first bridge pattern BP1 electrically connecting the first body portions BE1. The sensing electrode RE may include second body portions BE2 adjacent to each other in the second direction (the y direction), and a second bridge pattern BP2 electrically connecting the second body portions BE2.

In one or more embodiments, the first body portions BE1, the second body portions BE2, and the second bridge pattern BP2 may be located on the same layer, and the first bridge pattern BP1 may be located on a different layer from the first body portions BE1, the second body portions BE2, and the second bridge pattern BP2. As an example, the first bridge pattern BP1 may be located below the second bridge pattern BP2. In one or more embodiments, the second body portions BE2 and the second bridge pattern BP2 may be integrally provided. The first bridge pattern BP1 and the second bridge pattern BP2 may cross in different directions from each other, and may partially overlap each other in a plan view.

FIG. 8B schematically shows a cross-section of the touch sensor TS shown in FIG. 8A, taken along the line III-III' of FIG. 8A. Referring to FIG. 8B, the touch sensor layer 400 may be located on the encapsulation layer 300. The touch sensor layer 400 may include a first insulating layer 401, a first conductive layer MTL1, a second insulating layer 403, a second conductive layer MTL2, and a third insulating layer 405.

The first insulating layer 401 may be located on the encapsulation layer 300, and the first conductive layer MTL1 may be located on the first insulating layer 401. The first insulating layer 401 may cover the encapsulation layer 300, and may be configured to reduce or prevent damage to the encapsulation layer 300. In one or more embodiments, the first insulating layer 401 may be omitted.

The first conductive layer MTL1 may be located on the first insulating layer 401. The first conductive layer MTL1 may include the first bridge pattern BP1.

The second insulating layer 403 may be located on the first conductive layer MTL1, and the second conductive layer MTL2 may be located on the second insulating layer 403. The second conductive layer MTL2 may include the first body portions BE1 and the second bridge pattern BP2 of the driving electrode TE.

The first conductive layer MTL1 and the second conductive layer MTL2 may each have a single-layered structure or a multi-layered structure. A conductive layer of a single-layered structure may include a metal layer or a transparent conductive layer. The metal layer may include at least one of molybdenum (Mo), silver (Ag), titanium (Ti), copper (Cu), aluminum (Al), or an alloy thereof. The transparent conductive layer may include a transparent conductive oxide, such as ITO, IZO, ZnO, or ITZO. In addition, the transparent conductive layer may include a conductive polymer, such as poly-3,4-ethylene dioxy thiophene (PEDOT), metal nanowires, graphene, or the like.

In one or more embodiments, the conductive layer of the multi-layered structure may include a plurality of metal layers. As an example, the conductive layer of a multi-layered structure may have a three-layered structure of Ti/Al/Ti. A conductive layer of a multi-layered structure may include at least one transparent conductive layer.

The third insulating layer 405 may be located on the second conductive layer MTL2. The first insulating layer 401, the second insulating layer 403, and/or the third insulating layer 405 may include an inorganic insulating material or an organic insulating material, and may have a single-layered structure or a multi-layered structure.

Each of the first body portions BE1 may be electrically connected to the first bridge pattern BP1 through a contact hole CNT passing through the second insulating layer 403. The second bridge pattern BP2 may be located over the first bridge pattern BP1, and the second insulating layer 403 may be located between the first bridge pattern BP1 and the second bridge pattern BP2 such that a capacitor is formed.

Although it is shown in FIGS. 8A and 8B that the sensing electrode RE including the second body portions BE2 and the second bridge pattern BP2 is integrally provided, the disclosure is not limited thereto. As an example, the driving electrode TE including the first body portions BE1 and the first bridge pattern BP1 may be integrally provided. In this case, the first body portions BE1, the second body portions BE2, and the first bridge patterns BP1 may be located on the second conductive layer MTL2, and the second bridge pattern BP2 may be located on a different layer (e.g., the first conductive layer MTL1) from the second body portion BE2.

FIG. 8C is an enlarged schematic view of a region IV of the driving electrode TE shown in FIG. 8A. Referring to FIG. 8C, the driving electrode TE may have a mesh (or a grid, a lattice) structure. As an example, the first body portion BE1 and the first bridge pattern BP1 of the driving electrode TE may have a mesh structure. The mesh structure may include first conductive lines and second conductive lines crossing each other, wherein the first conductive lines extend in a fourth direction DR4, and the second conductive lines extend in a fifth direction DR5 crossing the fourth direction DR4. The fourth direction DR4 and the fifth direction DR5 may be directions respectively crossing the first direction (the x direction) and the second direction (the y direction). The first conductive lines and the second conductive lines may define a plurality of electrode openings EOP.

In one or more embodiments, one electrode opening EOP may overlap one pixel PX. As an example, the pixels PX may include a first pixel PX1 configured to emit light of a first color, a second pixel PX2 configured to emit light of a second color, and a third pixel PX3 configured to emit light of a third color. In a plan view, the first pixel PX1, the second pixel PX2, or the third pixel PX3 may be located inside respective electrode openings EOP. In one or more other embodiments, one electrode opening EOP may overlap a unit pixel group including a plurality of pixels PX.

Similarly to the driving electrode TE shown in FIG. 8C, the sensing electrodes RE may have a mesh structure. Light emitted by the pixels PX located below the touch sensor layer 400 may pass through the driving electrode TE and the sensing electrode RE through the electrode openings EOP.

Figure 9A:
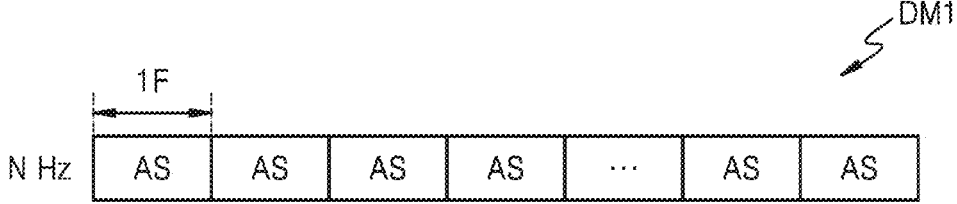
FIGS. 9A and 9B are conceptual views to explain a display mode according to a driving frequency of a display.
Figure 9B:
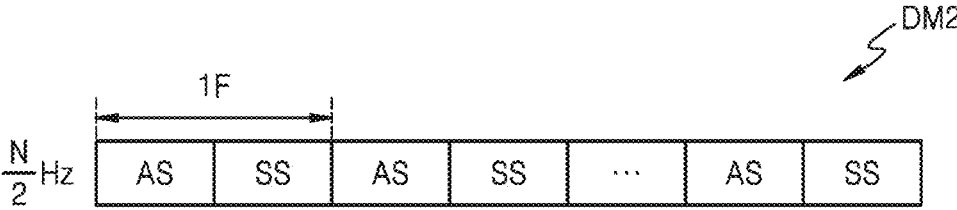

FIGS. 9A and 9B are conceptual views to explain a display mode according to a driving frequency of the display DU.

Referring to FIGS. 9A and 9B, the display DU according one or more embodiments may support a variable refresh rate. The display driver DDV of the display DU supporting a variable refresh rate may operate by changing the driving frequency within a range between a maximum driving frequency and a minimum driving frequency.

According to the driving frequency, one frame 1F may include a first scan period AS, or the first scan period AS and one or more second scan periods SS. As shown in FIG. 9A, in a first display mode DM1 in which the display driver DDV operates at a driving frequency of N Hz, one frame 1F may include one first scan period AS.

As shown in FIG. 9B, in a second display mode DM2 in which the display driver DDV operates at a driving frequency of N/2 Hz, one frame 1F may include one first scan period AS and one second scan period SS.

The display driver DDV may include two or more display modes. As an example, the display driver DDV may further include display modes in which one frame 1F includes one first scan period AS and two or more second scan periods SS. When the driving frequency is low, the one frame 1F may increase.

The first scan period AS may be defined as an address scan period in which a data signal is written in a pixel PX in response to a gate signal turning on a write transistor within a pixel PX, and a pixel PX emits light at a brightness corresponding to a written data signal. An operation in which a data signal is written in the pixel PX from the data line DL may be referred to as a data-programming operation.

The second scan period SS may be defined as a self-scan period in which a data signal is not written in a pixel PX by a gate signal turning off a write transistor of the pixel PX. During the second scan period SS, a data signal written and stored during the first scan period AS may be maintained in a pixel PX, and the pixel PX may emit light at a brightness corresponding to the written data signal. When the number of second scan periods SS included in one frame 1F increases, power consumption may be reduced.

In one or more embodiments, the length of the first scan period AS and the length of the second scan period SS may be the same or substantially the same. As an example, when the maximum driving frequency is about 120 Hz, each of the first scan period AS and the second scan period SS may be about 8.3 ms. In the first display mode DM1, one frame 1F may be about 8.3 ms, and in the second display mode DM2, one frame 1F may be about 16.6 ms. In the case where the length of the first scan period AS and the length of the second scan period SS are the same, change in the image quality according to change in the refresh rate may be reduced.

Figure 10A:
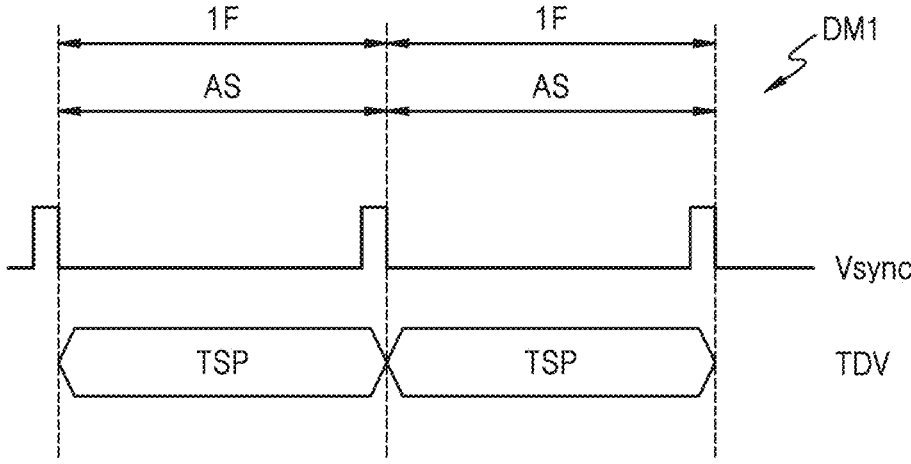
FIG. 10A is a view showing input/output signals of a display apparatus in a first display mode.
Figure 10B:
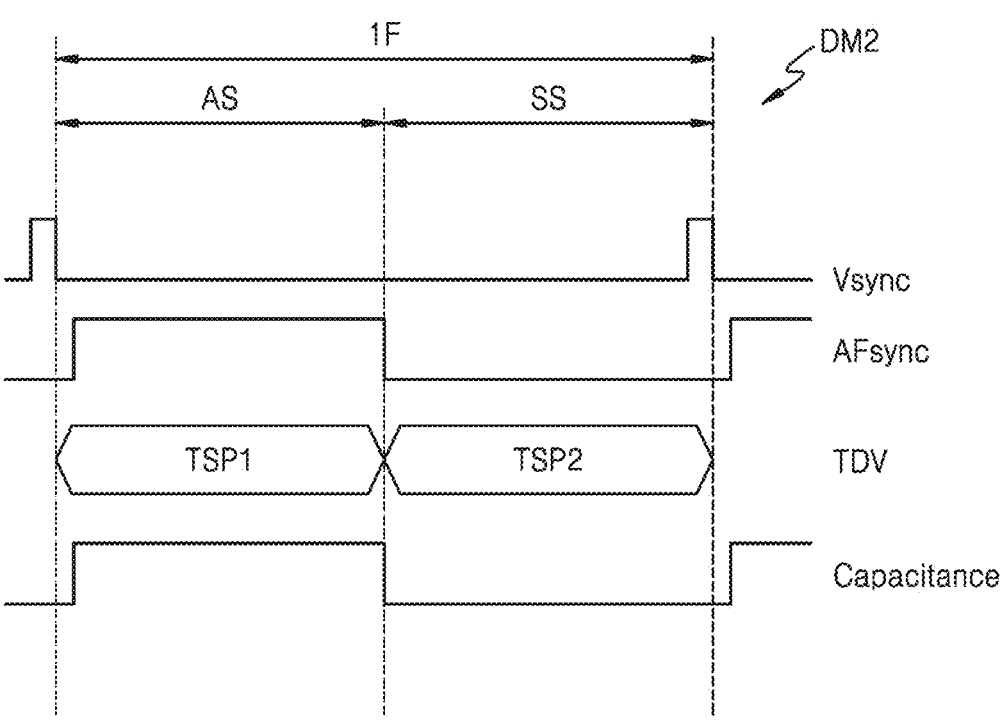
FIG. 10B is a view showing input/output signals of a display apparatus in a second display mode.

FIG. 10A is a view showing input/output signals of the display apparatus in the first display mode, and FIG. 10B is a view showing input/output signals of the display apparatus in the second display mode.

Referring to FIG. 10A, when the display driver DDV operates in the first display mode DM1, each frame 1F may include one first scan period AS. As described above, a vertical synchronization signal Vsync is a signal defining a start of one frame 1F, and may be received from an external host and the like. One frame period and the first scan period AS may start based on a falling edge of a vertical synchronization signal Vsync.

While the display driver DDV is driven in the first display mode DM1, the first scan period AS may overlap one touch scan period TSP. During one touch scan period TSP, the touch sensor driver TDV may perform, one time, a touch scan operation of applying driving signals Tx to the driving electrodes TE of the touch sensor TS, of receiving sensing signals Rx from the sensing electrodes RE, and of transmitting touch data TD generated by processing the received sensing signals Rx to an external host system or the like. A touch report rate of the touch sensor driver TDV may be the same as a refresh rate of the display DU. In other words, in the case where the display driver DDV operates at a driving frequency of about N Hz in the first display mode DM1, a touch report rate of the touch sensor driver TDV may be about N Hz.

Referring to FIG. 10B, when the display driver DDV operates in the second display mode DM2, each frame 1F may include one first scan period AS and one second scan period SS. In the case where the display driver DDV operates at a driving frequency of about N Hz in the first display mode DM1, the display driver DDV may operate at a driving frequency of about N/2 Hz in the second display mode DM2. Because a vertical synchronization signal Vsync is a signal defining a start of one frame 1F, the frequency of a vertical synchronization signal Vsync may be about N/2 Hz. In one or more embodiments, the frequency of a vertical synchronization signal Vsync in the first display mode DM1 may be about 120 Hz, and the frequency of a vertical synchronization signal Vsync in the second display mode DM2 may be about 60 Hz. One frame period and the first scan period AS may start based on a falling edge of a vertical synchronization signal Vsync.

The timing controller 14 or a separate application processor may be configured to generate an active frame synchronization signal AFsync, and to transfer the same to the touch sensor driver TDV. An active frame synchronization signal AFsync may be a signal having a first-level voltage (e.g., an on-voltage) during the first scan period AS, and having a second-level voltage (e.g., an off-voltage) that is different from the first-level voltage during the second scan period SS. Although it is shown in FIG. 10B that an active frame synchronization signal AFsync has a high-level voltage during the first scan period AS, and has a low-level voltage during the second scan period SS, an active frame synchronization signal AFsync may have a low-level voltage during the first scan period AS and may have a high-level voltage during the second scan period SS, in one or more other embodiments.

In one or more embodiments, an active frame synchronization signal AFsync may have a first-level voltage during the first scan period AS of the second display mode DM2. In this case, the touch sensor driver TDV may discriminate the display mode of the display driver DDV based on whether a first-level voltage of an active frame synchronization signal AFsync is applied. In one or more other embodiments, an application processor and the like may be configured to transfer a separate signal for discriminating the display mode of the display driver DDV to the touch sensor driver TDV.

While the display driver DDV operates in the second display mode DM2, the touch sensor driver TDV may be configured to perform one touch scan operation during each of a first touch scan period TSP1 and a second touch scan period TSP2. The first scan period AS may overlap the first touch scan period TSP1, and the second scan period SS may overlap the second touch scan period TSP2. That is, the touch sensor driver TDV may be configured to perform two scan operations per frame 1F. Accordingly, even when the display driver DDV operates at the driving frequency of about N/2 Hz, a touch report rate of the touch sensor driver TDV may be maintained at about N Hz.

Because a data-programming operation in which a data signal is written in a pixel PX is performed during the first scan period AS, relatively large noise may occur. Because the touch sensor layer 400 is located on the display layer 200, the touch sensor TS may be influenced by display noise due to pixels PX. As an example, even when there is no touch event during the first scan period AS, a capacitance value of the touch sensor TS may be maintained high due to display node. In contrast, during the second scan period SS in which a data programing operation is not performed, display noise may be reduced.

In the first display mode DM1 including only the first scan period AS, a capacitance value of the touch sensor TS is maintained relatively constant, but in the second display mode DM2 including the first scan period AS and the second scan period SS, a difference between a maximum value and a minimum value of the capacitance of the touch sensor TS may increase. Accordingly, in the second display mode DM2, touch jitter may increase and a signal noise ratio (SNR) of the touch sensor device TU may be reduced.

Accordingly, while the display driver DDV operates in the first display mode DM1, the touch sensor driver TDV may be configured to supply a first driving signal to the touch sensor TS. While the display driver DDV operates in the second display mode DM2, the touch sensor driver TDV may be configured to supply a second driving signal during the first touch scan period TSP1, and to supply a third driving signal to the touch sensor TS during the second touch scan period TSP2. In this case, a second driving signal and a third driving signal may be signals with different sampling numbers, frequencies, waveforms, and the like.

Figure 11A:
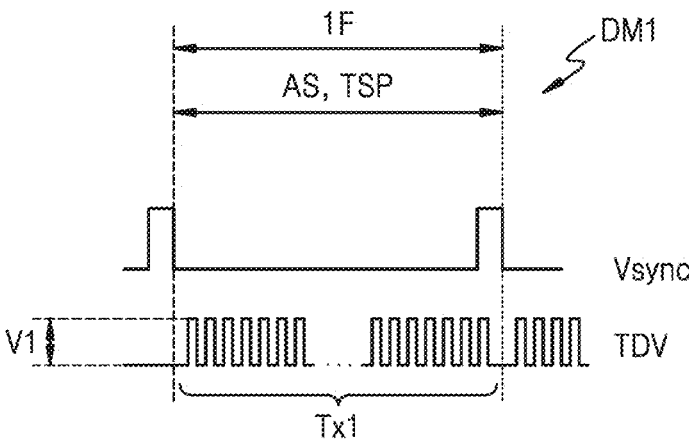
FIG. 11A is a view showing input/output signals of a display apparatus in a first display mode.
Figure 11B:
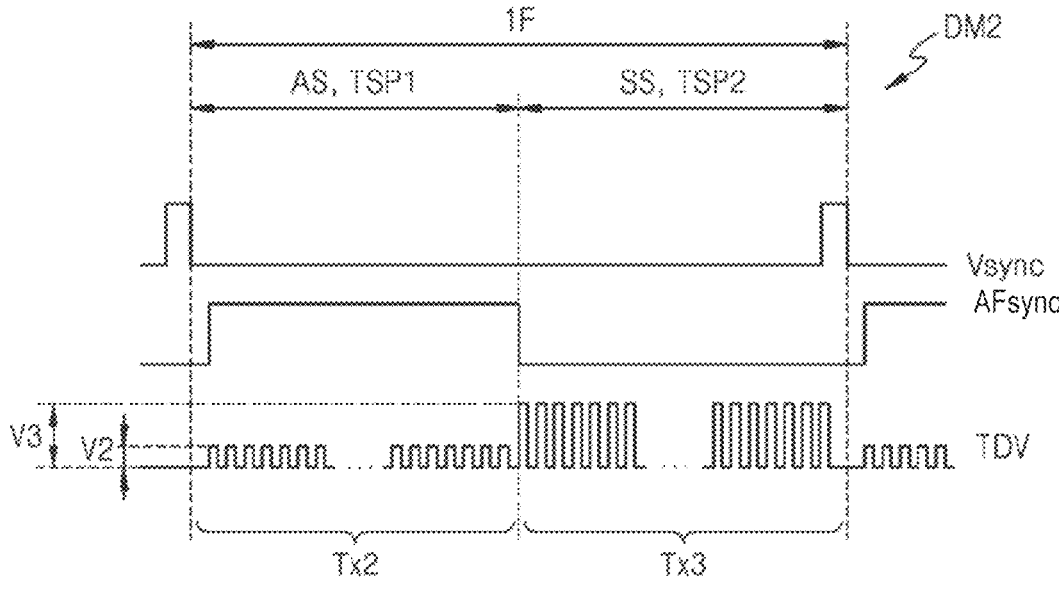
FIG. 11B is a view showing input/output signals of a display apparatus in a second display mode.

FIG. 11A is a view showing input/output signals of the display apparatus in the first display mode, and FIG. 11B is a view showing input/output signals of the display apparatus in the second display mode.

Referring to FIG. 11A, in the first display mode DM1, each frame 1F may include only one first scan period AS. The first scan period AS may overlap the touch scan period TSP.

During the touch scan period TSP, the touch sensor driver TDV may be configured to apply a first driving signal Tx1 to the driving electrodes TE of the touch sensor TS. In one or more embodiments, a first driving signal Tx1 may have a first driving voltage V1, which is a difference between a high-level voltage and a low-level voltage.

Referring to FIG. 11B, in the second display mode DM2, each frame 1F may include one first scan period AS and one second scan period SS. An active frame synchronization signal AFsync may have a first-level voltage during the first scan period AS and a second-level voltage during the second scan period SS. The first scan period AS may overlap the first touch scan period TSP1, and the second scan period SS may overlap the second touch scan period TSP2.

The touch sensor driver TDV may be configured to apply a second driving signal Tx2 to the driving electrodes TE of the touch sensor TS during the first touch scan period TSP1, and to apply a third driving signal Tx3 to the driving electrodes TE of the touch sensor TS during the second touch scan period TSP2 using an active frame synchronization signal AFsync. In other words, while the display driver DDV operates in the second display mode DM2, the touch sensor driver TDV may be configured to supply a second driving signal Tx2 to the touch sensor TS during the first scan period AS, and to supply a third driving signal Tx3 to the touch sensor TS during the second scan period SS.

A second driving signal Tx2 may have a second driving voltage V2, and a third driving signal Tx3 may have a third driving voltage V3. In this case, the second driving voltage V2 may be less than the third driving voltage V3.

In one or more embodiments, the second driving voltage V2 of the second driving signal Tx2 may be about 0.5 times the first driving voltage V1 of the first driving signal Tx1, and the third driving voltage V3 of the third driving signal Tx3 may be about 1.5 times the first driving voltage V1. In this case, the magnitudes of the second driving voltage V2 and the third driving voltage V3 may be adjusted according to display noise. As an example, in the case where a capacitance value of the touch sensor TS increasing due to display noise during the first scan period AS is large, the second driving voltage V2 of the second driving signal Tx2 may have a value that is less than about 0.5 times the first driving voltage V1.

In one or more other embodiments, the display driver DDV may operate in a third display mode, and each frame 1F may include one first scan period AS and k second scan periods SS, wherein k is a positive integer. The first scan period AS may overlap the first touch scan period TSP1, and each of the second scan periods SS may overlap the second touch scan period TSP2. While the display driver DDV operates in the third display mode, the touch sensor driver TDV may be configured to supply a second driving signal Tx2 to the touch sensor TS during the first scan period AS, and to supply a third driving signal Tx3 to the touch sensor TS during each second scan period SS. A second driving signal Tx2 may have a second driving voltage V2, and a third driving signal Tx3 may have a third driving voltage V3.

In this case, the second driving voltage V2 of the second driving signal Tx2 may be about 1/(k+1) times the first driving voltage V1 of the first driving signal Tx1, and the third driving voltage V3 of the third driving signal Tx3 may be about (k+2)/(k+1) times the first driving voltage V1. The magnitudes of the second driving voltage V2 and the third driving voltage V3 may be adjusted according to display noise.

By making the second driving voltage V2 of the second driving signal Tx2 and the third driving voltage V3 of the third driving signal Tx3 different, touch jitter due to display noise in the second display mode DM2 may be reduced, and the SNR of the touch sensor device TU may be improved or optimized.

FIGS. 12 to 15 are views showing input/output signals of a display apparatus in the second display mode.

Figure 12:
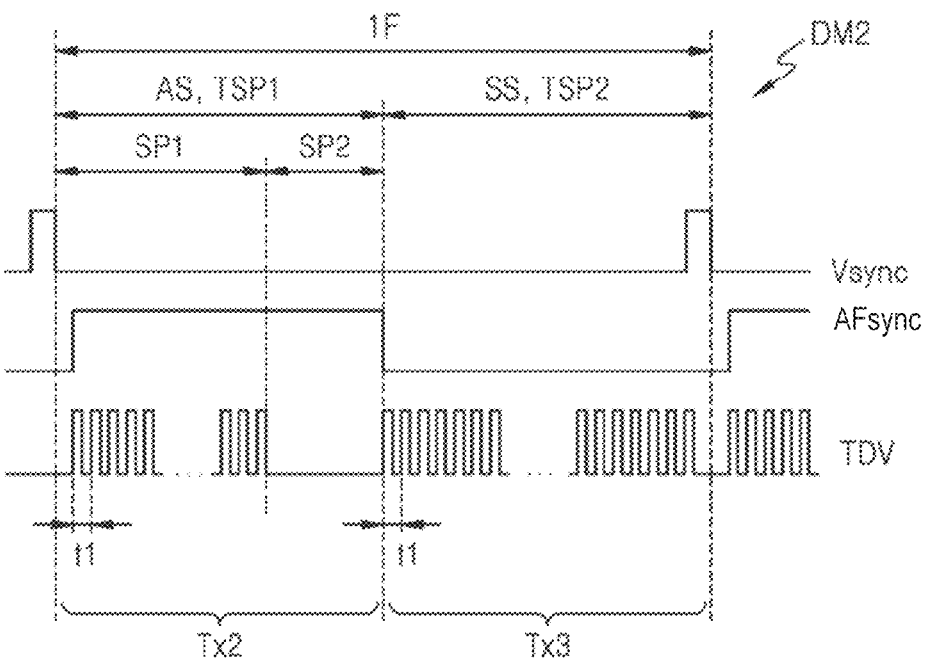
FIGS. 12 to 15 are views showing input/output signals of a display apparatus in a second display mode.

Referring to FIG. 12, when the display driver DDV operates in the second display mode DM2, each frame 1F may include one first scan period AS and one second scan period SS. An active frame synchronization signal AFsync may have a first-level voltage during the first scan period AS and a second-level voltage during the second scan period SS.

The first scan period AS may overlap the first touch scan period TSP1, and the second scan period SS may overlap the second touch scan period TSP2. The first touch scan period TSP1 may include a first sub-period SP1 and a second sub-period SP2.

The touch sensor driver TDV may be configured to apply a second driving signal Tx2 to the driving electrodes TE of the touch sensor TS during the first scan period AS (or the first touch scan period TSP1), and to apply a third driving signal Tx3 to the driving electrodes TE of the touch sensor TS during the second scan period SS (or the second touch scan period TSP2) using an active frame synchronization signal AFsync.

The touch sensor driver TDV may perform sampling by a first sampling number during the first scan period AS, and may perform sampling by a second sampling number that is greater than the first sampling number during the second scan period SS. Because the touch sensor driver TDV performs sampling based on the period of a driving signal, the first sampling number may be proportional to the number of pulses (or on-voltage signals) of the second driving signal Tx2 during the first scan period AS, and the second sampling number may be proportional to the number of pulses (or on-voltage signals) of the third driving signal Tx3 during the second scan period SS.

In one or more embodiments, the second driving signal Tx2 may repeat on- and off-voltages in first periods t1 during the first sub-period SP1, and may maintain the off-voltage during the second sub-period SP2. Here, the first period t1 represents a driving signal period in which the waveform of the driving signal repeats. In one or more other embodiments, the touch sensor driver TDV may be configured to output a second driving signal Tx2 during only the first sub-period SP1, and not to output a second driving signal Tx2 during the second sub-period SP2.

That is, the touch sensor driver TDV may be configured to perform sampling during only the first sub-period SP1 of the first scan period AS, and not to perform sampling during the second sub-period SP2. In contrast, the touch sensor driver TDV may be configured to perform sampling during the entire section of the second scan period SS by outputting a third driving signal Tx3 that repeats an on-voltage and an off-voltage during the second scan period SS.

In one or more embodiments, the period of a second driving signal Tx2 and the period of a third driving signal Tx3 may be the same. As an example, when the period of a second driving signal Tx2 is the first period t1, the period of a third driving signal Tx3 may be equally the first period t1.

By reducing the sampling number during the first scan period AS, where display noise may have a large influence, touch jitter caused by display noise in the second display mode DM2 may be reduced, and the SNR of the touch sensor device TU may be improved or optimized.

Figure 13:
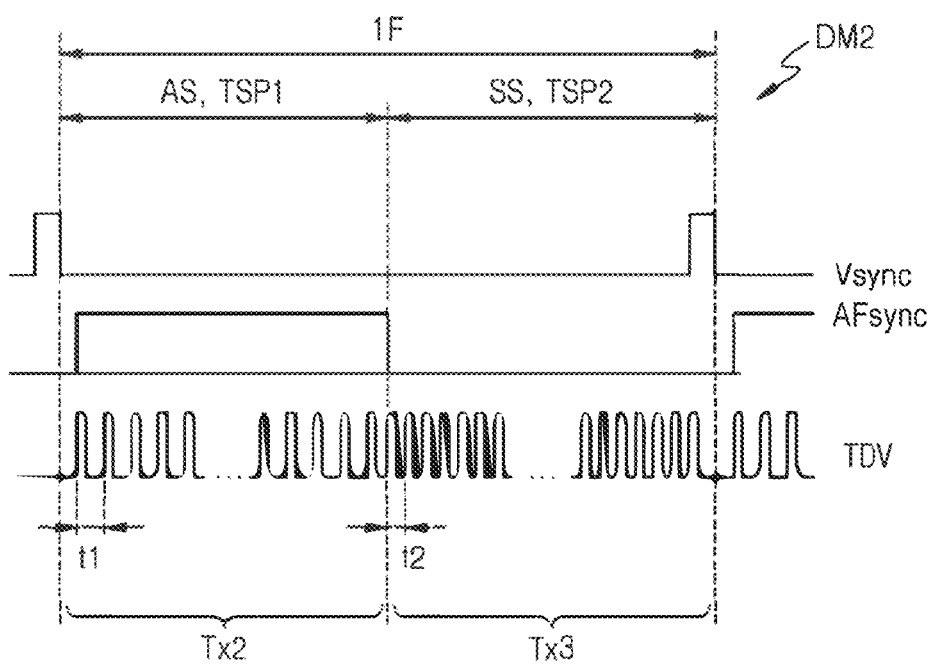

Referring to FIG. 13, while the display driver DDV operates in the second display mode DM2, the touch sensor driver TDV may be configured to apply a second driving signal Tx2 to the driving electrodes TE of the touch sensor TS during the first scan period AS, and to apply a third driving signal Tx3 having a different frequency from that of the second driving signal Tx2 to the driving electrodes TE of the touch sensor TS during the second scan period SS using an active frame synchronization signal AFsync.

The second driving signal Tx2 may have the first period t1 that repeats an on-voltage and an off-voltage, and the third driving signal Tx3 may have the second period t2 that is different from the first period t1. In other words, the second driving signal Tx2 may have a first frequency 1/t1, and the third driving signal Tx3 may have a second frequency 1/t2 that is different from the first frequency. Here, the first frequency and the second frequency are driving signal frequencies or sampling frequencies, and may have a range of hundreds of Hz to hundreds of kHz. The first frequency may be a frequency that is advantageous in avoiding display noise and the like, and the second frequency may be a frequency that is advantageous in improving touch sensitivity.

In one or more embodiments, the second frequency may be greater than the first frequency. In this case, the first period t1 of the second driving signal Tx2 may be greater than the second period t2 of the third driving signal Tx3. Accordingly, even in the case where the first scan period AS does not include the second sub-period SP2 in which a second driving signal Tx2 is maintained at an off-voltage, the sampling performance number during the first scan period AS may be less than the sampling performance number during the second scan period SS.

Figure 14:
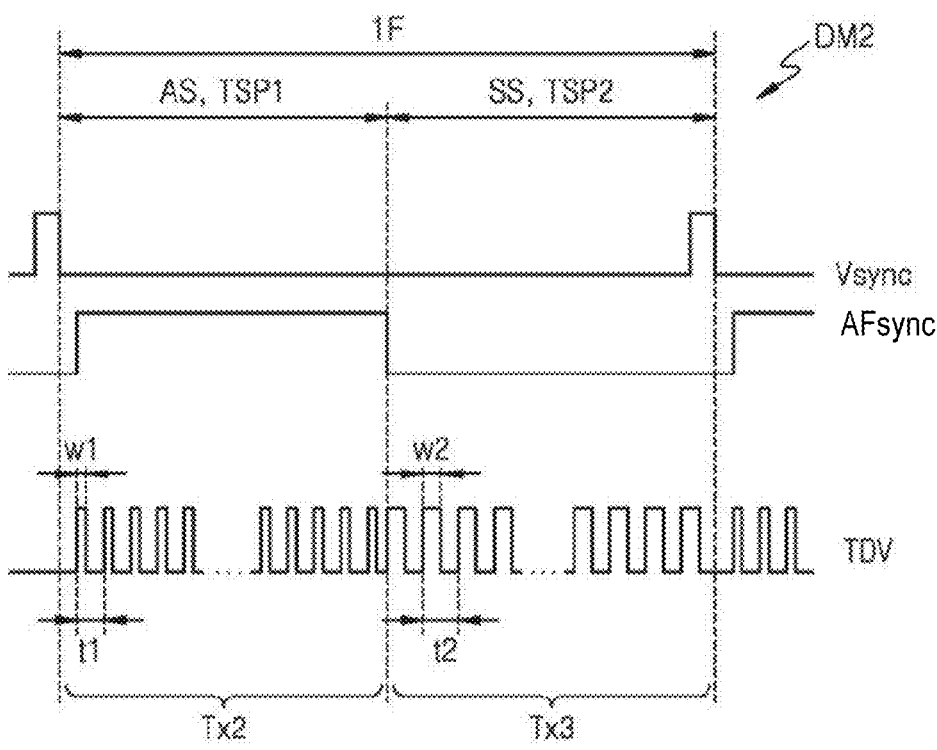

Referring to FIG. 14, while the display driver DDV operates in the second display mode DM2, the touch sensor driver TDV may be configured to apply a second driving signal Tx2 to the driving electrodes TE of the touch sensor TS during the first scan period AS, and to apply a third driving signal Tx3 to the driving electrodes TE of the touch sensor TS during the second scan period SS using an active frame synchronization signal AFsync.

The second driving signal Tx2 may have a first pulse width w1, and the third driving signal Tx3 may have a second pulse width w2 that is different from the first pulse width w1. Here, the pulse width denotes a time interval from about 50% of the rising time of the pulse to about 50% of the falling time of the pulse. The first pulse width w1 may have a value suitable for avoiding display noise. The second pulse width w2 may be different from the first pulse width w1, and may have a value for improving touch sensitivity of the touch sensor device TU. As an example, the first pulse width w1 may be less than the second pulse width w2.

In one or more embodiments, because the pulse width of the second driving signal Tx2 is different from the pulse width of the third driving signal Tx3, the second driving signal Tx2 may have the first period t1, and the third driving signal Tx3 may have the second period t2 that is different from the first period t1. In other words, the second driving signal Tx2 may have a first frequency 1/t1, and the third driving signal Tx3 may have a second frequency 1/t2 different from the first frequency.

In one or more other embodiments, the second driving signal Tx2 and the third driving signal Tx3 may have the same period by adjusting a duty cycle of the second driving signal Tx2 and the third driving signal Tx3. In other words, the second driving signal Tx2 and the third driving signal Tx3 may have different pulse widths but have the same frequency. Here, the duty cycle of the driving signal denotes a ratio of a pulse width to a period.

Figure 15:
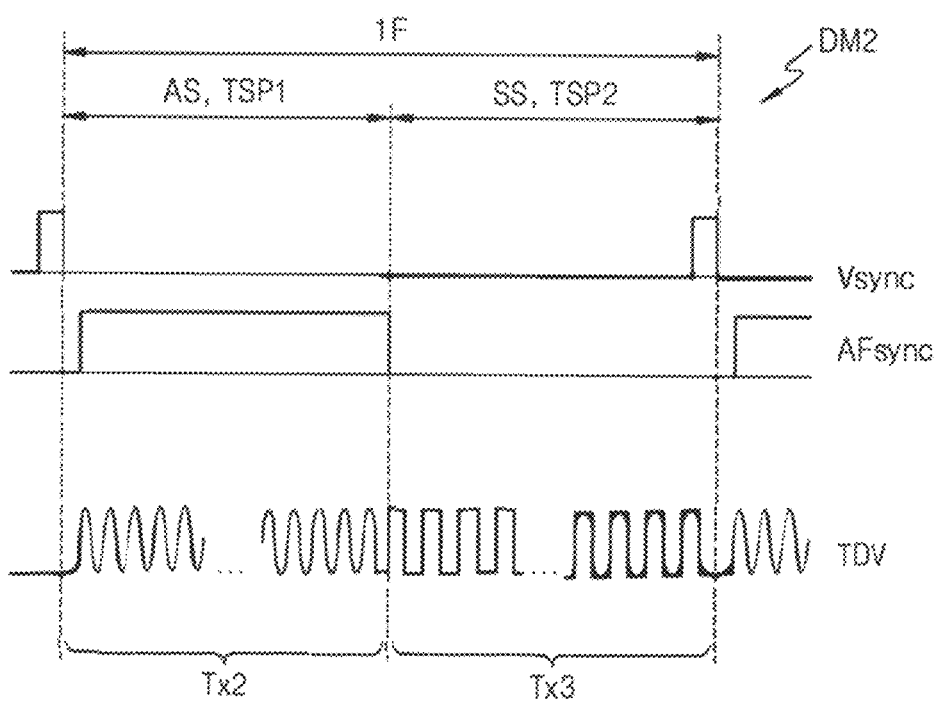

Referring to FIG. 15, while the display driver DDV operates in the second display mode DM2, the touch sensor driver TDV may be configured to apply a second driving signal Tx2 to the driving electrodes TE of the touch sensor TS during the first scan period AS, and to apply a third driving signal Tx3 to the driving electrodes TE of the touch sensor TS during the second scan period SS using an active frame synchronization signal AFsync.

The second driving signal Tx2 may be a sinusoidal wave, and the third driving signal Tx3 may be a pulse wave or a square wave. Here, the sinusoidal wave may be a sine wave or a cosine wave. Because noise of the sinusoidal wave may be suitably removed, the SNR of the touch sensor device TU may be improved by applying the second driving signal Tx2, which is a sinusoidal wave, during the first scan period AS when the influence of display noise is large. In contrast, because the pulse wave has a high touch sensitivity, the touch sensitivity of the touch sensor device TU may be improved by applying the third driving signal Tx3, which is a pulse wave, during the second scan period SS. Furthermore, because the sinusoidal wave has low power consumption compared to the pulse wave, entire power consumption of the display apparatus 1 may be reduced.

For easy understanding, although FIGS. 11B to 15 show the case where the second driving signal Tx2 and the third driving signal Tx3 are different from each other in their driving voltage, sampling number, period (or frequency), pulse width, and/or waveform (sinusoidal wave, pulse wave), the disclosure is not limited thereto. The disclosure includes various combinations of the above embodiments. The second driving signal Tx2 and the third driving signal Tx3 may be different from each other in at least one of their driving voltage, sampling number, period, pulse width, or waveform depending on an operating environment, such as display noise and the like, and a driving mode.

According to one or more embodiments, even when a refresh rate of the display changes, a touch report rate of the touch sensor device may be maintained constant. Accordingly, even while the display is driven at low frequencies, reduction in the touch sensitivity of the touch sensor device may be reduced or prevented.

According to one or more embodiments, the touch sensor driver is configured to output a noise-robust driving signal during an address scan operation section, and to output a driving signal having high touch sensitivity during a self-scan operation section, thereby improving the SNR of the touch sensor device, and reducing or preventing reduction in the touch sensitivity.

According to one or more embodiments, the display apparatus with a reduced jitter phenomenon caused by display noise and with improved touch-sensing performance may be implemented. However, the scope of the disclosure is not limited to the above.

It should be understood that embodiments described herein should be considered in a descriptive sense only and not for purposes of limitation. Descriptions of aspects within each embodiment should typically be considered as available for other similar aspects in other embodiments. While one or more embodiments have been described with reference to the figures, it will be understood by those of ordinary skill in the art that various changes in form and details may be made therein without departing from the spirit and scope as defined by the following claims, with functional equivalents thereof to be included therein.

What is claimed is:

1. A display apparatus comprising:
pixels;
a touch sensor above the pixels, and comprising first touch electrodes and second touch electrodes;
a display driver configured to drive the pixels in a first display mode in which a frame comprises a first scan period, or in a second display mode in which another frame comprises the first scan period and one or more second scan periods; and
a touch sensor driver configured to:
supply a first driving signal to the touch sensor in the first display mode; and
supply a second driving signal to the touch sensor during the first scan period, and supply a third driving signal to the touch sensor during the one or more second scan periods, in the second display mode,
wherein a touch report rate of the touch sensor driver is the same in the first display mode and in the second display mode.

2. The display apparatus of claim 1, wherein the display driver is configured to supply a first synchronization signal to the touch sensor driver, the first synchronization signal having a first-level voltage during the first scan period and having a second-level voltage during the one or more second scan periods.

3. The display apparatus of claim 1, wherein the second driving signal has a first driving voltage, and wherein the third driving signal has a second driving voltage that is greater than the first driving voltage.

4. The display apparatus of claim 3, wherein the first driving signal has a third driving voltage, wherein the first driving voltage is about 0.5 times the third driving voltage, and wherein the second driving voltage is about 1.5 times the third driving voltage.

5. The display apparatus of claim 3, wherein, in the second display mode, the other frame comprises one first scan period and k second scan periods, the first driving signal has a third driving voltage, the first driving voltage is about 1/(k+1) times the third driving voltage, and the second driving voltage is about (k+2)/(k+1) times the third driving voltage.

6. The display apparatus of claim 1, wherein, in the second display mode, the touch sensor driver has a sampling number during the first scan period that is less than a sampling number during the one or more second scan periods.

7. The display apparatus of claim 6, wherein the first scan period has a first sub-period and a second sub-period, and wherein the second driving signal is configured to repeat an on-voltage and an off-voltage during the first sub-period, and to maintain the off-voltage during the second sub-period.

8. The display apparatus of claim 7, wherein the second driving signal and the third driving signal have a same frequency.

9. The display apparatus of claim 1, wherein the second driving signal has a first frequency, and wherein the third driving signal has a second frequency that is different from the first frequency.

10. The display apparatus of claim 9, wherein the second frequency is greater than the first frequency.

11. The display apparatus of claim 1, wherein the second driving signal has a first pulse width, and wherein the third driving signal has a second pulse width that is different from the first pulse width.

12. The display apparatus of claim 11, wherein the first pulse width is less than the second pulse width.

13. The display apparatus of claim 11, wherein the second driving signal and the third driving signal have a same frequency.

14. The display apparatus of claim 1, wherein the second driving signal is a sinusoidal wave, and wherein the third driving signal is a pulse wave.

15. A display apparatus comprising:

pixels;

a touch sensor above the pixels, and comprising first touch electrodes and second touch electrodes;

a display driver configured to drive the pixels in a first display mode in which a frame comprises a first scan period, or in a second display mode in which another frame comprises the first scan period and one or more second scan periods; and a touch sensor driver configured to:

supply a first driving signal to the touch sensor in the first display mode; and supply a second driving signal to the touch sensor during the first scan period, and supply a third driving signal to the touch sensor during the one or more second scan periods, in the second display mode, the second driving signal and the third driving signal being different with respect to a driving voltage, a sampling number, a frequency, or a waveform.

16. The display apparatus of claim 15, wherein the display driver is configured to supply a first synchronization signal to the touch sensor driver, the first synchronization signal having a first-level voltage during the first scan period and a second-level voltage during the one or more second scan periods.

17. The display apparatus of claim 15, wherein the second driving signal has a first driving voltage, and wherein the third driving signal has a second driving voltage that is greater than the first driving voltage.

18. The display apparatus of claim 15, wherein the first scan period has a first sub-period and a second sub-period, and wherein the second driving signal is configured to repeat an on-voltage and an off-voltage during the first sub-period and to maintain the off-voltage during the second sub-period.

19. The display apparatus of claim 18, wherein the second driving signal and the third driving signal have a same frequency.

20. The display apparatus of claim 15, wherein the second driving signal has a first pulse width, and wherein the third driving signal has a second pulse width that is different from the first pulse width.

21. The display apparatus of claim 15, wherein the second driving signal is a sinusoidal wave, and wherein the third driving signal is a pulse wave.

* * * * *